United States Patent
Ivanov et al.

(10) Patent No.: US 11,592,516 B2
(45) Date of Patent: Feb. 28, 2023

(54) POSITIONING BASED ON CALENDAR INFORMATION

(71) Applicant: HERE Global B.V., Eindhoven (NL)

(72) Inventors: Pavel Ivanov, Tampere (FI); Lauri Aarne Johannes Wirola, Tampere (FI); Henri Jaakko Julius Nurminen, Tampere (FI)

(73) Assignee: HERE Global B.V., Eindhoven (NL)

(*) Notice: Subject to any disclaimer, the term of this patent is extended or adjusted under 35 U.S.C. 154(b) by 107 days.

(21) Appl. No.: 16/935,990

(22) Filed: Jul. 22, 2020

(65) Prior Publication Data

US 2021/0025965 A1 Jan. 28, 2021

(30) Foreign Application Priority Data

Jul. 23, 2019 (EP) .................................. 19187826

(51) Int. Cl.
*G01S 3/02* (2006.01)
*G01S 5/02* (2010.01)
*G01S 5/00* (2006.01)

(52) U.S. Cl.
CPC .......... *G01S 5/02523* (2020.05); *G01S 5/013* (2020.05); *G01S 5/0269* (2020.05); *G01S 5/014* (2020.05); *G01S 5/016* (2020.05); *G01S 5/02525* (2020.05); *G01S 2205/02* (2020.05)

(58) Field of Classification Search
CPC ............. G01S 5/02523; G01S 5/02525; G01S 5/0269; G01S 5/013; G01S 5/014; G01S 5/016
USPC ....................................................... 342/451
See application file for complete search history.

(56) References Cited

U.S. PATENT DOCUMENTS

| | | | |
|---|---|---|---|
| 7,673,248 B2 * | 3/2010 | Narayanaswami .. | G06Q 10/109 715/764 |
| 8,320,939 B1 * | 11/2012 | Vincent ................ | G01C 21/206 709/224 |
| 9,301,100 B1 | 3/2016 | Jampani et al. | |
| 9,435,875 B2 | 9/2016 | Masters | |
| 9,456,311 B2 * | 9/2016 | Ozkan ..................... | H04W 4/40 |
| 9,641,977 B2 | 5/2017 | DiAcetis et al. | |

(Continued)

OTHER PUBLICATIONS

Extended European Search Report for European Application No. 19187826.3 dated Dec. 4, 2019, 9 pages.

(Continued)

*Primary Examiner* — Chuong P Nguyen
(74) *Attorney, Agent, or Firm* — Alston & Bird LLP

(57) ABSTRACT

A method includes obtaining piece(s) of calendar information indicative of at least one appointment taking place in a space and extracting a set of space identifiers representing space(s) of the venue. The space identifier(s) for one or more spaces are extracted based on an indoor map of the venue. The method also includes determining or triggering determining whether at least a part of the set of space identifiers or one or more spaces of the set of space identifiers match(es) the at least one space as represented by the piece(s) of calendar information; and if a match is found: determining one or more reference location estimates. A respective reference location estimate is indicative of a location of the space that was determined to be a match. A corresponding apparatus, computer program product and system are also provided.

20 Claims, 8 Drawing Sheets

(56) References Cited

U.S. PATENT DOCUMENTS

| | | | |
|---|---|---|---|
| 9,953,047 B2 | 4/2018 | Lambert et al. | |
| 10,506,373 B2* | 12/2019 | Warren | G06F 16/24578 |
| 10,579,226 B2* | 3/2020 | Leong | G06F 3/0485 |
| 10,753,762 B2* | 8/2020 | Shelby | G01C 21/367 |
| 10,798,538 B2* | 10/2020 | Jain | H04L 67/52 |
| 11,096,008 B1* | 8/2021 | Batten | G01S 5/02523 |
| 11,226,391 B2* | 1/2022 | Luomi | H04W 4/025 |
| 2008/0109718 A1 | 5/2008 | Narayanaswami | |
| 2010/0048185 A1* | 2/2010 | Lee | H04M 3/42348 |
| | | | 455/414.1 |
| 2011/0264615 A1 | 10/2011 | Rajan et al. | |
| 2011/0285591 A1 | 11/2011 | Wong | |
| 2013/0267251 A1 | 10/2013 | Khorashadi et al. | |
| 2015/0350843 A1 | 12/2015 | Jensen et al. | |
| 2017/0026804 A1 | 1/2017 | Tsai et al. | |
| 2017/0372223 A1* | 12/2017 | Vaughn | G06F 16/9535 |
| 2021/0337346 A1* | 10/2021 | Faustino | G01S 5/013 |

OTHER PUBLICATIONS

Huh et al., *An Indoor Location-Based Control System Using Bluetooth Beacons for Lot Systems* [online] [retrieved May 2, 2019] Retrieved via the Internet: https://www.mdpi.com/1424-8220/17/12/2917/pdf (dated Dec. 19, 2017) 22 pages.

Office Action for European Application No. 19187826.3 dated Oct. 12, 2022, 7 pages.

\* cited by examiner

POSITIONING BASED ON CALENDAR INFORMATION

CROSS-REFERENCE TO RELATED APPLICATIONS

This application claims priority to European Application No. 19187826.3, filed Jul. 23, 2019, the entire contents of which are incorporated herein by reference.

FIELD

The following disclosure relates to the field of indoor positioning, or more particularly relates to systems, apparatuses, and methods for determining more accurate location estimates indicative of indoor locations of mobile devices.

BACKGROUND

Modern global cellular (GSM (Global System for Mobile Communications), CDMA (Code Division Multiple Access), WDCMA (Wideband CDMA), TD-SCDMA (Time Division Synchronous CDMA), LTE (Longterm Evolution), LTE-A (LTE Advanced), NB-IoT (NarrowBand-Internet-of-Things)) and non-cellular (primarily WLAN (Wireless Local Area Network), but also BT (Bluetooth), BLE (Bluetooth Low Energy), ZigBee, LoRa, to name but a few non-limiting examples) positioning technologies are based on collecting large global databases containing information on the cellular and non-cellular signals. A large portion of the data typically originates from the users of these positioning technologies.

The data from the users is typically in the form of fingerprints respectively fingerprint information. Such fingerprints contain GNSS (Global Navigation Satellite System)-based or WLAN-based position estimate and measurements taken from the radio interfaces (cellular, non-cellular).

The measurements contain e.g.:
Global and/or Local IDs of the cellular network cells observed, and, optionally,
signal strength and/or pathloss estimates;
timing measurements (Timing Advance or Round-Trip Time).
BSSIDs (Basic Service Set Identifiers) (MAC (Medium Access Control) address of the air interface) of the WLAN access points observed and, optionally,
SSIDs (Service Set Identifiers);
signal strengths (RSSI (received signal strength index), physical Rx level in dBm ref 1 mW, etc.)
timing measurements (Round-trip Time).

This data gets uploaded to the server or server cloud, where generating of models of wireless communication nodes for positioning purposes based on the fingerprints received from the multitude of the users takes place. Such models may be coverage areas, node positions, radio propagation models, Rx fields, etc. In the end, these models are transferred back to the user terminals for use in position determination.

Although the end user terminal has GNSS-capability, the end user can still benefit from using cellular/non-cellular positioning technologies in terms of time-to-first-fix and power consumption. Also, not all applications require highly accurate GNSS-based position (e.g. for local weather application it suffices to use cell-based location estimate). Also, cellular/non-cellular positioning technologies work indoors and in urban canyons, which are generally challenging environments for GNSS-based technologies.

The positioning can function in two modes. The first mode is the terminal-assisted mode, in which the terminal performs the measurements of the cellular and/or non-cellular air interface, provides the measurements to a remote server, which in turn provides the position estimate back to the device.

The second mode is the terminal-based mode, in which the device has a local copy of the radio map (or most likely, a subset of the global radio map). Such a subset can be downloaded by the device from a remote server for the (geographic) area of interest (e.g. a small area around the current location, or for a whole country, to name but a few non-limiting examples) out of a global radio map comprising a plurality of such subsets. Such a subset can further be pre-installed to the device in the factory, but even in that case the data needs to be refreshed at some point.

Many different approaches were proposed in the prior art for resolving location indoors. Most common ones rely on fusion of GNSS and sensor data and extend location estimation to GNSS-denied areas based on the sensor data. Other approaches rely on probes collected outdoors, in order to localize probes indoors.

SUMMARY OF SOME EXEMPLARY EMBODIMENTS

However, it is a drawback that while reference locations for probe data can be easily obtained outdoors, e.g. from GNSS, obtaining references indoors is still a big challenge. Because GNSS does not work indoors in general, sensor based solutions quickly diverge in the absence of GNSS fixes. Therefore, any additional source of information from indoors is of great use.

It is thus, inter alia, an object of the invention to achieve a more accurate positioning for indoor positioning.

According to a first exemplary aspect of the present invention, a method is disclosed, the method comprising:
obtaining one or more pieces of calendar information indicative of at least one appointment taking place in a space;
extracting a set of space identifiers representing one or more spaces of the venue, wherein the one or more spaces respectively their one or more space identifiers are extracted based on an indoor map of the venue;
determining or triggering determining whether at least a part of the set of space identifiers or one or more spaces of the set of space identifiers matches or match the at least one space as represented by the obtained one or more pieces of calendar information; and in case such a match is found:
determining one or more reference location estimates, wherein a respective reference location estimate of the one or more reference location estimates is indicative of a location of the space that was determined to be a match, wherein the location of the space is derived from the indoor map.

This method may for instance be performed and/or controlled by an apparatus, for instance a server. Alternatively, this method may be performed and/or controlled by more than one apparatus, for instance a server cloud comprising at least two servers. Alternatively, the method may for instance be performed and/or controlled by a mobile device, e.g. a smartphone, tablet, portable navigation device, wearable, IoT (Internet-of-Things) device, to name but a few non-limiting examples. For instance, the method may be performed and/or controlled by using at least one processor of the server, server cloud, or mobile device.

Such a mobile device may for instance be portable (e.g. weigh less than 5, 4, 3, 2, or 1 kg). The mobile device may for instance comprise or be connectable to a display for displaying information, e.g. a route that is guided/navigated to a user, to name but one non-limiting example. The mobile device may for instance comprise or be connectable to means for outputting sound, e.g. in the form of spoken commands or information. The mobile device may for instance comprise or be connectable to one or more sensors for determining the devices position, such as for instance a GNSS receiver, in the form of a GPS receiver. The mobile device may for instance comprise or be connectable to one or more sensors, e.g. in the form of an accelerometer and/or a gyroscope for gathering (e.g. measuring) further information. The mobile device may for instance comprise or be connectable to a receiver and/or a transmitter (e.g. a transceiver) for receiving and/or sending information. For instance, the mobile device may comprise one or more radio receivers (e.g. radio transceivers) to gather measurements based on GNSS- or non-GNSS-based positioning signals, which may for instance enable a coarse position estimate indicative of the devices position to be determined or triggered to be determined. The mobile device may for instance be suitable for outdoor and/or indoor navigation respectively positioning. The mobile device may for instance comprise various other components like a user interface for receiving user input.

According to a further exemplary aspect of the invention, a computer program is disclosed, the computer program when executed by a processor causing an apparatus, for instance a server, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

The apparatus may for instance be a server, a server cloud or a mobile device, or a module of a server, a server cloud, or a mobile device, or a component (e.g. a chip) of a server, a server cloud, or a mobile device.

According to a further exemplary aspect of the invention, a system is disclosed, comprising:
an apparatus (e.g. a server or a server cloud) according to any aspect of the invention as disclosed above, and one or more mobile devices, wherein the one or more mobile devices are respectively configured to provide one or more pieces of calendar information, and optionally, one or more pieces of fingerprint information to the apparatus.

According to a further exemplary aspect of the invention, a system is disclosed, comprising: a plurality of apparatuses (e.g. at least two) according to any aspect of the invention as disclosed above.

In the following, exemplary features and exemplary embodiments of all aspects of the present invention will be described in further detail.

Each respective piece of the one or more pieces of calendar information may for instance be indicative of at least one appointment. Alternatively, some piece(s) of the one or more pieces of calendar information may for instance not be indicative of any appointment. Further, all of the pieces of the one or more pieces of calendar information together may for instance be indicative of at least one appointment The one or more pieces of calendar information may for instance be obtained by retrieving the one or more pieces of calendar information in case of a respective mobile device performing and/or controlling the method according to the first exemplary aspect of the present invention. The one or more pieces of calendar information may for instance be obtained by receiving the one or more pieces of calendar information in case of a respective server or server cloud performing and/or controlling the method according to the first exemplary aspect of the present invention.

A venue may for instance be a building, shopping mall, office complex, public accessible location (e.g. station, airport, university or the like), to name but a few non-limiting examples. An area may for instance be a public place, urban area, rural area, industrial area, or a combination thereof, to name but a few non-limiting examples. The space may for instance be a specific room, area, and/or part of an area and/or venue. Thus, such a space is located within an area and/or venue.

Each respective piece of the one or more pieces of calendar information, or at least a part of the one or more pieces of calendar information may for instance further be indicative of a specific area and/or venue, but it may for instance also be possible that the respective area and/or venue is unknown, thus, not being comprised or represented by a respective piece of calendar information, or at least a part of the one or more pieces of calendar information. In the latter case, only one or more specific spaces (e.g. represented by one or more space identifiers, e.g. space names, to name but one non-limiting example) may for instance be known. A respective piece of calendar information, or a part of it, may at a minimum be indicative of a respective space identifier the at least one appointment should take or takes place within the area and/or venue.

One or more radio nodes may for instance be comprised by an area and/or a venue, e.g. by an infrastructure of the venue and/or area, or a part of it. Such a radio node of the one or more radio nodes may for instance be a radio node, e.g. of the area and/or venue. Such a radio node may for instance be used for indoor positioning and/or floor detection, e.g. according to BT- (Bluetooth) and/or BLE- (Bluetooth Low Energy) specification, or may for instance be a Wi-Fi Access Point for indoor positioning and/or floor detection, e.g. according to the WLAN- (Wireless Local Area Network) specification, to name but a few non-limiting examples.

Such a radio node (e.g. WiFi access point, beacon device, or a combination thereof, to name but a few non-limiting examples) of the one or more radio nodes, e.g. of the area and/or venue, may for instance comprise or be connectable to a transceiver, e.g. according to the BT-, BLE, and/or WLAN-specification to provide wireless-based communication. Each radio node of the one or more radio nodes, e.g. of the area and/or venue, may for instance use such a transceiver for transmitting and/or broadcasting one or more signals, e.g. comprising one or more information (e.g. one or more identifiers), such as a SSID of the respective radio node of the one or more radio nodes.

Signals sent by such one or more radio nodes may for instance be gathered (e.g. measured) as one or more pieces of fingerprint information. Such one or more pieces of fingerprint information may for instance be gathered (e.g. measured) by one or more mobile devices. A respective fingerprint information of the one or more pieces of fingerprint information may for instance be indicative of one or more observation reports of signals sent by one or more radio nodes observable at a certain location. For example, the radio transmission parameters of a parametric radio model of a radio positioning support device may at least partially correspond to and/or be determined based on one or more radio transmission parameters associated with this radio node of the one or more radio nodes, wherein the one or more radio transmission parameters associated with this radio node of the one or more radio nodes may for example be represented by and/or contained in the one or more observation reports (e.g. one or more observation reports associated with the radio node and/or an (e.g. adjacent) radio node of the one or more radio nodes), e.g. in the form of one or more pieces of fingerprint information.

A respective fingerprint information of the one or more pieces of fingerprint information may for instance at least be indicative of one or more identifiers of one or more radio nodes which respective signals are observable at a certain location at which the respective fingerprint information is gathered. For instance, based on such one or more identifiers of the one or more radio nodes, a respective location of a respective radio node may for instance be determined, e.g. based on a look-up table to name but one non-limiting example.

Further, based on a respective fingerprint information a location may for instance be determined at least partially based on an indoor radio map of an area and/or venue (e.g. the area and/or venue) since it may for instance be derivable from such an indoor radio map at which specific location a certain selection of one or more radio nodes of the area and/or venue are observable. It will be understood that for instance in case a respective fingerprint information is further indicative of one or more radio transmission parameters, as disclosed above, the respective location may for instance be determined (e.g. estimated) more accurately.

According to an exemplary embodiment of all exemplary aspects of the present invention, the method further comprises:

determining or triggering determining one or more coarse location estimates.

A respective coarse location estimate of the one or more coarse location estimates may for instance be indicative of or represent an estimation of a location at which a device (e.g. a mobile device) whose location is to be determined is located. The coarse location estimate may for instance comprise or represent a pair of coordinates, e.g. latitude- and longitude coordinates or x-, and y-coordinates. Alternatively, the coarse location estimate may for instance comprise or represent three-dimensional coordinates, e.g. latitude-, longitude- and altitude-coordinates, or x-, y- and z-coordinates.

The one or more coarse location estimates may for instance represent one or more locations of the respective mobile device(s) at which they are located e.g. in the area and/or venue during the time of appointment, e.g. represented by the variables or parameters [XTimeA1, XTimeA2, . . . ]. The one or more coarse location estimates may for instance be determined at least partially based on GNSS/Wi-Fi/cellular signals, e.g. comprised or represented by a respective fingerprint information of one or more pieces of fingerprint information. It is noted that this exemplary step may for instance only facilitate a further search for one or more space identifiers to be comprised by the set of space identifiers, but is not strictly necessary, it is also possible that one or more locations of the respective one or more spaces of the area and/or venue already exist in the one or more pieces of calendar information, e.g. as details of the at least one appointment.

One or more coarse location estimates may for instance be determined or triggered to be determined. For instance, a respective coarse location estimate may for instance be triggered to be determined by a respective mobile device, wherein e.g. a fingerprint information may for instance be sent and then be obtained by a respective server so that the respective server is enabled to determine (e.g. estimate) the respective coarse location estimate. In this case, the respective coarse location estimate(s) may for instance be determined by a server or a server cloud, e.g. a positioning server, e.g. based on a request that is received. Thus, e.g. the server or the server cloud is triggered to determine the coarse location estimate.

Additionally or alternatively, a respective coarse location, or the one or more coarse location estimates may for instance be determined, e.g. by the at least one apparatus performing and/or controlling the method according to the first exemplary aspect of the present invention.

A respective coarse location estimate may for instance be determined or triggered to be determined based on GNSS (Global Navigation Satellite System)-based and/or non-GNSS-based positioning. Examples for GNSS-based positioning are GPS, GALILEO, GLONASS (Globalnaja nawigazionnaja sputnikowaja sistema), and examples for non-GNSS-based positioning are fingerprinting based on radio signals sent by e.g. BT/BLE beacons and/or WLAN access points, to name but a few non-limiting examples.

A respective coarse location estimate indicative of a location of a respective mobile device (e.g. within the area and/or venue) may for example indicate a pre-determined area and/or space covering the (e.g. absolute) position of the respective mobile device, but may not indicate the specific, thus more accurate, (e.g. absolute) position of the respective mobile device. For example, the pre-determined area and/or space may be part of a plurality of pre-determined areas and/or spaces for each of which it is pre-determined whether or not it is part of the vicinity of the pre-determined area and/or venue, to name but one non-limiting example. A GNSS-based and/or the a-GNSS (assisted GNSS)-based positioning may for instance use one or more pieces of fingerprint information (e.g. observation report(s)) of measured (e.g. radio) signals or radio signal parameters to be considered. Each of those measurements may for instance be considered to be indicative of whether or not the respective mobile device was located in the vicinity of the pre-determined area and/or venue when the respective radio signals and/or radio signal parameters were gathered (e.g. measured or captured). For example, the respective mobile device may be considered to be in the vicinity of the pre-determined area and/or venue, if the respective radio signals and/or radio signal parameters represented by the one or more measurements indicate a pre-determined area at least partially defining the vicinity of the pre-determined area and/or venue.

A set of (e.g. potential) space identifiers (e.g. names of respective one or more spaces located within the area and/or venue) representing one or more spaces of the area and/or venue are extracted. Further, the one or more spaces respectively their one or more space identifiers may for instance be extracted based on (e.g. out of) an indoor map. The respective indoor map may for instance be obtained (e.g. retrieved from a memory) or received prior to the extracting of the set of space identifiers of the area and/or venue. Such an indoor map may for instance be a floor plan of the area and/or venue, which may for instance at least comprise one or more space identifiers (e.g. names of spaces and/or locations) within the area and/or venue. Such an indoor map of a respective area and/or venue may for instance be obtainable from a public accessible database, e.g. via the Internet, to name but one non-limiting example. The indoor map may for instance be associated with respectively linked to the area and/or venue a respective mobile device is currently located. This may for instance be determined based on at least one respective coarse location estimate of the one or more coarse location estimates, to name but one non-limiting example.

The extracting of the one or more space identifiers to be comprised by the set of space identifiers out of the indoor map of the respective area and/or venue may for instance be performed and/or controlled at least partially automatically and/or repeatedly (e.g. periodically and/or continuously and/or for a pre-determined period of time). In this way, the set of space identifiers of a certain area and/or venue may for instance be updated or expanded by more accurate (e.g. up-to-date) spaces being comprised by the certain area and/or venue. For instance, a set of space identifiers (e.g. space names) in the form {SName1, SName2, . . . } and, optionally, their respective locations in the form {SLocation1, SLocation2, . . . } may for instance be extracted from one or more indoor maps of the respective area and/or venue. Further, the space identifiers to be comprised by the set of space identifiers may for instance be selected in the vicinity of the respective coarse location(s) of the mobile device(s), e.g. as represented by the determined one or more coarse location estimates.

The extracted space identifiers (e.g. space names), e.g. as {SName1, SName2, . . . } and comprised by the set of space identifiers may for instance be compared against the SNameA of the space of the at least one appointment as represented by a respective calendar information of the one or more pieces of calendar information, or as represented by all of the one or more pieces of calendar information together.

For instance, if one of the extracted space identifiers SNamei of the set of space identifiers matches with the space identifier SNameA e.g. of a respective calendar information, it can be considered that a respective user of the respective mobile device from which the respective calendar information was obtained, is at the location of the space associated with the matching name (e.g. derived from an indoor map, as disclosed above). Such a location may for instance be represented by numerical information (e.g. Latitude, Longitude, floor-coordinates) about the user location.

Further, it is determined or triggered to be determined (e.g. a respective mobile device may for instance request a server to perform and/or control the determining) whether at least a part of the set of space identifiers or one or more spaces of the set of space identifiers matches (and/or equals), at least in part, the at least one space (e.g. represented by a respective space identifier) as represented by the obtained one or more pieces of calendar information.

For instance, the set of space identifiers may be in a form of a list. The set of space identifiers (e.g. associated with a certain area and/or venue) may for instance be stored in a memory, e.g. a database. Further, a stored set of space identifiers may for instance be obtained (e.g. retrieved) from such a database.

For instance, the determining of the match may be performed and/or controlled e.g. by comparing space identifier(s) (e.g. names of spaces of the area and/or venue) as comprised or represented by the set of space identifiers with respective space identifier(s) (e.g. space name(s) of the at least one appointment) as represented or derived from the one or more pieces of calendar information. A result of such a comparison may for instance be a list of probabilities that a respective space identifier of the set of space identifiers represents a respective space as represented by the one or more pieces of calendar information, e.g. by a respective space identifier. For instance, a respective piece of calendar information, or more than one piece of calendar information may for instance represent that the at least one appointment is to take place in a certain space (e.g. represented by a name of the space) of a certain area and/or venue.

A respective space identifier as comprised by the set of space identifiers, and/or as represented by the one or more pieces of calendar information may for instance be a (e.g. character) string. Such a string of the set of space identifiers may for instance be compared to another string as represented by the one or more pieces of calendar information. Optionally, it may for instance be determined a probability of the comparison, e.g. only a part of compared strings match with each other. For instance, in case the matching part is sufficiently long (e.g. more than 3 characters, to name but one non-limiting example) and further optionally, unique, then the probability can be determined to be equal to 1. If, however, the compared space identifiers do not match (e.g. at all), and optionally are not sufficiently long, and further optionally, are not unique, then the probability can be determined to be equal to 0. It will be understood that there may also be one or more intermediate cases between the two aforementioned cases with a probability of 1 and another probability of 0. For instance, such an intermediate case may be when one short variant of the other is determined during the comparison, e.g. "Meeting room" and "M room", in which case the probability may be between 0 and 1, not equaling 0 or 1.

Then, e.g. a certain threshold value may for instance be pre-defined, to determine whether or not a match is found. For instance, in case a probability is equal to or above 0.6 (to name but one non-limiting example) it may for instance be pre-defined that then a match is found.

One or more reference location estimates are determined. A respective reference location estimate of the one or more reference location estimates is indicative of a location of the space that was determined to be a match, wherein the location of the space is derived from the indoor map. The location may for instance be defined by the respective indoor map of the venue. For instance, in case a respective coarse location estimate is indicative of a location roughly in the vicinity of a certain space of the area and/or venue, based on the respective one or more pieces of calendar information, a respective reference location estimate is then determined to be indicative of (or comprise and/or represent) the (e.g. exact) location of the space.

The one or more reference location estimates may for instance be stored, e.g. in a memory. Such a memory may for instance comprise a database. The memory may for instance be comprised by or be connectable to the apparatus performing and/or controlling the method according to the first exemplary aspect of the present invention. Then, the one or more reference location estimates may for instance be used e.g. in the future, e.g. for comparing the coarse position estimate with the one or more reference location estimates. For instance, the one or more reference location estimates can then be used to determine more accurate location estimates in a positioning. Further, the one or more reference location estimates stored in the memory may for instance be associated with (e.g. linked to) a respective mobile device, e.g. via an identifier of the respective mobile device. In this way, the one or more reference location estimates may for instance be kept (e.g. stored) in a personalized way, e.g. to use a respective reference location estimate only for a respective mobile device. In this way, efficiency of a positioning that is at least partially be based on such one or more reference location estimates is enhanced.

Further, the one or more reference location estimates may for instance be provided (e.g. sent or output), e.g. to an entity from which e.g. a respective calendar information of the one or more pieces of calendar information stems. Alternatively, the one or more reference location estimates may for instance be provided to another entity that is different from the entity e.g. from which a respective obtained calendar information stems, and which transmits (e.g. relays) the one or more reference location estimates to the entity from which the respective obtained calendar information of the one or more pieces of calendar information stems. The one or more reference location estimates may for instance be output via a communication interface of the apparatus performing and/or controlling the method according to the first exemplary aspect of the present invention. Such a communication interface may for instance comprise one or more radio transceiver (e.g. transmitter and receiver), e.g. according to WLAN, BT, BLE, cellular, or a combination thereof communication standard, to name but a few non-limiting examples.

According to an exemplary embodiment of all exemplary aspects of the present invention, the method further comprises:

storing and/or providing the determined one or more reference location estimates to be utilized as reference for further sensor data.

The one or more determined reference location estimates may for instance be stored in a memory, e.g. comprised by or connectable to the apparatus performing and/or controlling the method according to the first exemplary aspect of the present invention.

The one or more determined reference location estimates may for instance be provided, e.g. to one or more further entities, and/or to one or more mobile devices. The one or more determined reference location estimates may for instance be provided by sending the one or more determined reference location estimates, e.g. directly to one or more entities (e.g. one or more mobile device in case the apparatus is a server or server cloud) that are different from the apparatus performing and/or controlling the method according to the first exemplary aspect of the present invention, or to another entity that may for instance relay the one or more determined reference location estimates to one or more entities.

According to an exemplary embodiment of all exemplary aspects of the present invention, the calendar information is further indicative of a time period of the at least one appointment.

The time period of the at least one appointment may for instance define a time for the start of the at least one appointment. Further, the time period may for instance define a time for the end of the at least one appointment. The time period may be defined with some sort of tolerance dt, e.g. to account for a user coming early or late to the at least one appointment (e.g. a meeting) or leaving the at least one appointment meeting early or late, to name but a few non-limiting examples.

For instance, the at least one appointment may be represented by a respective calendar information of the one or more pieces of calendar information by a name of the at least one appointment. For instance, the at least one appointment may for instance take place in a certain space of the area and/or venue. Such a space may for instance be represented by the variable or parameter SNameA. Thus, a respective calendar information of the one or more pieces of calendar information may for instance comprise or represent the variable or parameter SNameA. The space identifier of the at least one appointment may for instance be extractable from a respective calendar information, and/or the one or more pieces of calendar information.

For instance, at the time (e.g. start of a meeting) of the at least one appointment, a respective coarse location estimate of the one or more coarse location estimates may for instance be determined. Further, one or more coarse location estimates for one or more mobile device (e.g. a plurality of mobile device) may for instance be determined. For instance, one respective coarse location estimate for every user attending the at least one appointment may for instance be determined.

For instance, from the one or more pieces of calendar information, information of at least one appointment of a user of the respective mobile device from which at least one piece of calendar information of the one or more pieces of calendar information stems may for instance be obtained (e.g. extracted), e.g. including or comprising one or more of the following:

a time period of the at least one appointment, e.g. represented by the variables or parameters [TimeAstart, TimeAend]; and Name of the at least one appointment space, e.g. represented by the variable or parameter SNameA (e.g. a meeting room name), wherein A refers to a specific appointment.

The estimated location of the respective mobile device during the at least one appointment may for instance be used to reference device sensor data, such as Wi-Fi/BLE/cellular measurements. For this purpose, according to an example embodiment of all exemplary aspects of the present invention, one or more pieces of reference location estimates are determined. Such one or more pieces of reference location estimates may for instance comprise geo-referenced radio measurements (e.g. in the form of one or more pieces of fingerprint information, to name but one non-limiting example). They may for instance then be used for an indoor radio map generation. Such an indoor radio map can then be used for indoor positioning, to name but one non-limiting example.

Further, e.g. to account for a user to attend to the at least one appointment later or leaving earlier from the at least one appointment, the time period [TimeAstart+dt, TimeAend−dt] may for instance be considered. Additionally, sensor data of the respective mobile device of the user may for instance be used, e.g. to estimate a time when user is finally in the at least one appointment. This may for instance be done by considering only a respective time period when the user of the respective mobile device does not move significantly or does not make steps, e.g. according to information gathered by an acceleration sensor of the respective mobile device, to name but one non-limiting example.

In this way, example embodiments according to all aspects of the present invention provide a way to learn e.g. geo-referenced radio measurements (as represented by the one or more pieces of reference location estimates) from indoors respectively indoor positioning scenarios, where traditional positioning methods fail.

According to an exemplary embodiment of all exemplary aspects of the present invention, the calendar information is associated with a user of a mobile device.

A respective calendar information of the one or more pieces of calendar information may for instance further be indicative of a user identifier enabling to identify a respective user or a respective mobile device from which a respective calendar information of the one or more pieces of calendar information stems (e.g. was received). Such a user identifier may for instance be a MSISDN (Mobile Station Integrated Services Digital Network Number), a MAC (Medium Access Control) address of a respective mobile device, or any kind of identification enabling a respective mobile device to be identified, to name but a few non-limiting examples.

According to an exemplary embodiment of all exemplary aspects of the present invention, the space of the venue is represented by a character string.

Such a character string may for instance be comprised by a respective space identifier. For instance, in case the one or more space identifiers of the set of space identifiers are determined based on an indoor map of the area and/or venue, a respective character string enabling identifying a space in the area and/or venue may for instance be comprised in the respective indoor map of the area and/or venue.

Then, e.g. one or more string-matching methods may for instance be used to determine the match between one or more space identifiers of the set of space identifiers, and one or more further space identifiers e.g. as extracted or derived from the one or more pieces of calendar information.

According to an exemplary embodiment of all exemplary aspects of the present invention, the determining of the one or more coarse location estimates further comprises:

obtaining or gathering one or more pieces of fingerprint information, wherein the obtaining or the gathering is performed and/or controlled during the time period of the at least one appointment; and wherein the one or more coarse location estimates are determined at least partially based on the one or more pieces of fingerprint information, wherein optionally the one or more coarse location estimates are determined or triggered to be determined during the time period of the at least one appointment.

The one or more pieces of fingerprint information are obtained in case the apparatus performing and/or controlling the method according to the first exemplary aspect of the present invention is a server or server cloud. In case the apparatus performing and/or controlling the method according to the first exemplary aspect of the present invention is a mobile device, the mobile device may for instance gather the one or more pieces of fingerprint information.

A respective fingerprint information of the one or more pieces of fingerprint information may for instance be indicative of at least one identifier of at least one radio node which sent signals are observable at the location at which the respective fingerprint information is gathered (e.g. measured). Further, a respective fingerprint information of the one or more pieces of fingerprint information may for instance be indicative of at least one received signal strength value with which sent signals are observable at the location at which the respective fingerprint information is gathered (e.g. measured). A respective fingerprint information may for instance enable a location to be determined at least partially based on a (e.g. indoor) radio map (e.g. of an area and/or venue) and the respective fingerprint information. For instance, based on knowing from which one or more radio nodes, and optionally, with which received signal strength value signals from the one or more radio nodes located in an area and/or venue (e.g. the area and/or venue) are observable, a location can be determined by comparing the respective fingerprint information to respective information as comprised or represented by a respective (e.g. indoor) radio map. The determining of the location may for instance be performed and/or controlled by a respective mobile device which gathered the respective fingerprint information, or may for instance be triggered to be determined e.g. from a positioning server providing such a determining of a location as a service.

The apparatus performing and/or controlling the method according to the first exemplary aspect of the present invention may for instance obtain (e.g. collect) and store sensor data (e.g. in the form of fingerprint information) from the user respectively their mobile device(s) during the time period [TimeAstart, TimeAend] of the at least one appointment, particularly based on Wi-Fi and BLE signal measurements.

Further, a respective fingerprint information may for instance be indicative of information gathered (e.g. measured) by one or more sensors comprised by or connectable to the respective mobile device, such as a gyroscope, an accelerometer, an inertial sensor, barometric sensor, e.g. to gather (e.g. measure) respective information e.g. indicative of a position and/or orientation and/or velocity of the respective mobile device in its surrounding, and/or an (e.g. absolute or relative) altitude value of the respective mobile device, to name but a few non-limiting examples.

According to an exemplary embodiment of all exemplary aspects of the present invention, the set of space identifiers is extracted further based on the one or more coarse location estimates, wherein the set of space identifiers comprises one or more spaces located in the vicinity (e.g. circle of pre-defined radius) of the one or more coarse location estimates.

The extracting of the set of space identifiers may for instance further comprise:
obtaining one or more space identifiers of one or more spaces.

For instance, the one or more spaces may be in the form of a list {Space1, Space2, . . . }, wherein the one or more spaces are located in the vicinity of the locations as represented by the coarse location estimates, e.g. obtained or gathered at the time period the at least one appointment takes place, e.g. in the following form: [XTimeA1, XTimeA2, . . . XTimeAK]. Such a list may for instance comprise the one or more space identifiers (e.g. space names) {SName1, SName2, . . . } and further the one or more space locations {SLocation1, SLocation2, . . . }. Such a list may for instance be obtained from an indoor map of the area and/or venue. Further, a circle of a pre-defined radius around median of locations [XTimeA1, XTimeA2, . . . , XTimeAK] may for instance be considered as an area of proximity to extract the set of space identifiers.

The extracting of the set of space identifiers may for instance further comprise:
determining (e.g. finding) SNamei that matches with SNameA e.g. one or more using string-matching methods.

For instance, such SNamei whose substring SNamei* may match exactly with sufficiently long substring SNameA* of SNameA. If no matching space identifiers are found, it may for instance not be proceeded with one or more further steps of the method according to the first exemplary aspect of the present invention.

If a respective space identifier e.g. with a matching name SNamei is determined (e.g. found), the respective location of the respective mobile device Spacei can be considered to be the space of the at least one appointment. Further, the location SLocationi can be considered to be the location of the user respectively its mobile device during the time of the at least one appointment, e.g. as represented by the variable or parameters [TimeAstart, TimeAend].

According to an exemplary embodiment of all exemplary aspects of the present invention, the storing and/or providing the determined one or more reference location estimates to be utilized as reference for further sensor data further comprises:
assigning the one or more pieces of fingerprint information obtained or gathered during the time period to the location of the space determined as the match.

The one or more pieces of fingerprint information may for instance be assigned to the location SLocationi of the space Spacei as well as to the space Spacei. Thus, e.g. measurements (e.g. in the form of the one or more pieces of fingerprint information) gathered (e.g. measured or collected) by a respective mobile device during the time [TimeAstart+dt, TimeAend−dt] of the at least one appointment are linked to the respective location of the space in which the at least one appointment takes place.

According to an exemplary embodiment of all exemplary aspects of the present invention, the method further comprises:
determining one or more outliers of the determined one or more reference location estimates at least partially based on a comparison of one or more pieces of fingerprint information obtained from one or more further mobile devices with the one or more pieces of fingerprint information gathered or obtained; and
discarding such one or more pieces of fingerprint information of the one or more pieces of fingerprint information gathered or obtained in case a mismatch of pieces of fingerprint information is determined by the comparison.

The one or more outliers determined may for instance be removed. In this way, e.g. one or more pieces of fingerprint information that are considered to be measurement outliers can be discarded in order to achieve more accurate location estimates in a positioning. This may for instance be done by comparing one or more pieces of fingerprint information gathered by a respective mobile device during the time [TimeAstart+dt, TimeAend−dt] of the at least one appointment with one or more further pieces of fingerprint information gathered previously and which may for instance already be associated with Spacei/SLocationi. Thus, the one or more further pieces of fingerprint information may for instance be already associated with one or more reference position estimates indicative of a location at which the at least one appointment takes place. For instance, if a respective fingerprint information mismatches with a certain amount (e.g. represented by a pre-defined threshold value) further pieces of fingerprint information already associated with the Spacei/SLocationi, then such a respective fingerprint information may for instance be discarded. If a proportion of discarded pieces of fingerprint information during the time period [TimeAstart+dt, TimeAend−dt] of the at least one appointment exceeds for instance the pre-defined threshold, e.g. all the pieces of fingerprint information gathered by the respective mobile device from the time [TimeAstart+dt, TimeAend−dt] of the at least one appointment may for instance be discarded.

These steps of the determining of one or more outliers and of the discarding may for instance only be performable and/or controllable in case the method is performed and/or controlled by a server or server cloud since a mobile device may not have access to one or more pieces of fingerprint information obtained from one or more further mobile devices, e.g. one or more further mobile devices of users that take part in the at least one appointment.

An example embodiment according to the first exemplary aspect of the present invention may further comprise that the one or more pieces of fingerprint information obtained from one or more further mobile devices are determined (e.g. selected) based on one or more further calendar information obtained from the respective one or more further mobile devices.

Further, one or more respective pieces of fingerprint information which are the basis for determining one or more reference location estimates may for instance be considered to be equal to the location SLocationi of the Spacei.

According to an exemplary embodiment of all exemplary aspects of the present invention, the method further comprises:
storing and/or providing the respective pieces of fingerprint information based on which the one or more reference location estimates were determined.

The respective pieces of fingerprint information based on which the one or more reference location estimates were determined may for instance be stored and/or provided in the same fashion as the one or more reference location estimates (see disclosure above).

The one or more determined reference location estimates may for instance be respectively associated with or linked to the respective pieces of fingerprint information gathered at or in the vicinity of the one or more locations of the one or more reference location estimates.

According to an exemplary embodiment of all exemplary aspects of the present invention, the method further comprises:

generating (e.g. creating) an indoor radio map (e.g. a new or updated radio map of the venue, or a part of it) at least partially based on the one or more reference location estimates, and on the respective pieces of fingerprint information.

The obtained (e.g. collected) one or more pieces of fingerprint information (e.g. in the form of one or more radio observation reports) may be used, at least partially, for generating or updating an indoor radio map (also referred to as radio positioning support map) of the area and/or venue. Such an indoor radio map may for instance be used for positioning purposes.

The apparatus performing and/or controlling the method according to the first exemplary aspect of the present invention may for instance be configured for generating or updating an indoor radio map of the area and/or venue. The indoor radio map may for instance be generated or updated at least partially based on a plurality of pieces of fingerprint information, e.g. gathered (e.g. measured) and provided (e.g. reported) to the apparatus by one or more mobile devices. Further, the indoor radio map may for instance be generated or updated based on the determined one or more pieces of reference location estimates enabling a more accurate positioning since the one or more pieces of reference location estimates represent a specific location that can be utilized to fine-tune a coarse location estimate. As disclosed in more details above, each fingerprint information of the one or more pieces (e.g. a plurality) of fingerprint information may represent at least one of (i) an observation position, (ii) one or more radio signals observed by a respective mobile device of the one more mobile devices at the observation position, (iii) one or more radio signal parameters of the observed one or more radio signals measured by the respective mobile device or (iv) a combination thereof.

The indoor radio map may for instance require that it is generated at least partially based on one or more pieces of fingerprint information. Further, the indoor radio maps may for instance be generated based on reference locations (e.g. as represented by the one or more reference location estimates) and pieces of fingerprint information. More precisely, the indoor radio map may for instance be generated based on such pieces of fingerprint information of the one or more pieces of fingerprint information, which have respectively an accurate location reference e.g. associated with it, or which comprise an accurate location reference. Such an accurate location reference may for instance be derivable from the determined one or more reference location estimates.

According to an exemplary embodiment of all exemplary aspects of the present invention, the method further comprises:

storing and/or providing the generated indoor radio map.

The generated or updated indoor radio map may for instance be provided (e.g. transmitted) to one or more mobile devices, e.g. via a communication network enabling the one or more mobile device to determine (e.g. estimate) their respective (current) location at least partially based on the provided indoor radio map.

Alternatively or additionally, the indoor radio map may for instance be stored, e.g. by holding the indoor radio map available in a memory. For example, the indoor radio map may for instance be obtained (e.g. received) as a result of generating or updating the indoor radio map, and subsequently, the indoor radio map may for instance be stored in a memory.

According to an exemplary embodiment of all exemplary aspects of the present invention, the indoor radio map comprises or represents one or more defined location information (e.g. respectively represented by latitude-, longitude-coordinates, floor, optionally venue; or x-, y-, z- (e.g. altitude)-coordinates, optionally venue) of the one or more spaces located within the venue.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
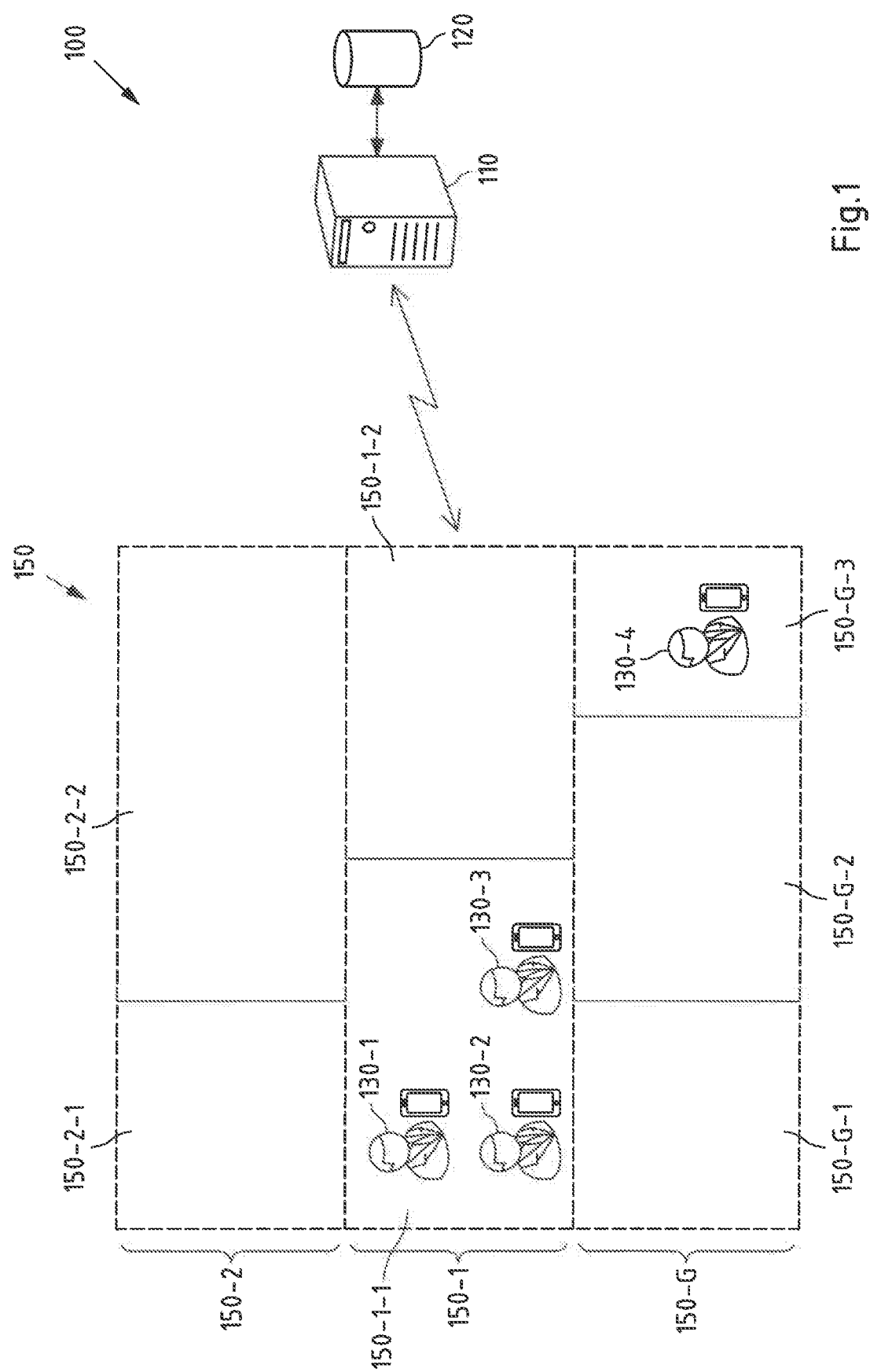
FIG. 1 a schematic block diagram of a system according to an exemplary aspect of the present invention.

FIG. 1 is a schematic high-level block diagram of a system 100 according to an example embodiment of the present invention.

Such a system 100 may for instance represent an architecture and/or environment that is/are configured, at least partially, to perform and/or control one or more exemplary aspects of the present invention.

System 100 comprises a server 110, an optional database 120, one or more mobile devices 130 (e.g. a smartphone, tablet, wearable, IoT-device; wherein in FIG. 1 four mobile devices 130-1 to 130-4 are exemplary shown), and a venue 150, which may also be an area. Inside the venue 150, one or more radio nodes (e.g. Wi-Fi access points and/or BT and/or BLE beacons, to name but a few non-limiting examples) may for instance be located and/or installed. In FIG. 1, such one or more radio nodes are not shown. Based on signals sent by such one or more radio nodes, and/or one or more satellites e.g. of a cellular communication network (not shown in FIG. 1), to name but a few non-limiting examples, the one or more mobile devices 130-1 to 130-4 may for instance gather (e.g. measure) one or more pieces of fingerprint information. At present, the area and/or venue 150 is a building, such as an office building to name but one non-limiting example. The building 150 comprises three floors 150-G, 150-1, and 150-2. Each floor 150-G, 150-1, and 150-2 may for instance comprise one or more spaces, such as rooms, public areas, meeting rooms, offices, or the like, to name but a few non-limiting examples. For instance, as shown in FIG. 1, floor 150-G is divided into or comprises three spaces 150-G-1, 150-G-2, and 150-G-3. Floor 150-1 is divided into or comprises two spaces 150-1-1 and 150-1-2. Floor 150-2 is divided into or comprises two spaces 150-2-1, and 150-2-2.

Each space of the building 150 may for instance be associated with a respective space identifier based on which the respective space can be identified. For instance, Space 150-1-1 may for instance be a meeting room. In the space 150-1-1, three mobile devices respectively their users are located, 130-1, 130-2, and 130-3. Space 150-G-3 may for instance be an office, e.g. the office of the shown user. This user may for instance have the mobile device 130-4.

The server 110 may alternatively be embodied as a server cloud (e.g. a plurality of servers connected, e.g. via the internet, and/or a communication network, and providing one or more services at least partially jointly). The server 110, which may for instance be embodied as a positioning respectively navigation server, may for instance be configured to provide e.g. one or more indoor radio maps, and/or perform and/or control positioning requests to determine (e.g. estimate) one or more location estimates of one or more mobile devices (e.g. one or more mobile devices 130-1 to 130-4) to be determined (e.g. estimated). The server 110 may for instance be connected to the one or more mobile devices 130, via a wirebound and/or wireless communication connection (e.g. according to the Wi-Fi, BT, BLE, and/or ZigBee communication standard, to name but a few non-limiting examples).

The optional database 120 may for instance be comprised by or connectable to server 110. In case the optional database 120 is comprised by server 110, server 110 and database 120 may form a single entity. The database 120 may for instance comprise a memory, e.g. for storing one or more pieces of calendar information, one or more coarse location estimates, one or more sets of space identifiers, one or more reference location estimates, one or more pieces of fingerprint information, one or more outliers, one or more indoor radio maps, one or more indoor maps, to name but a few non-limiting examples.

System 100 may for instance optionally comprise a communication network. The communication network may for instance be used for transmitting e.g. information between the server 110, the one or more mobile devices 130, and/or one or more radio nodes. The communication network may for instance be the Internet and/or a cellular communication network, to name but a few non-limiting examples. It will be understood that such a communication network may for instance be used for transmitting information between entities, devices, and/or units that are not explicitly shown in FIG. 1 and/or described within the meaning of the present invention. Alternatively, communication network may for instance be configured to transmit information for the entities, devices and/or units that are explicitly shown in FIG. 1 and/or described within the meaning of the present invention.

Example embodiments according to all aspects of the present invention enable a method, e.g. for deducing location(s) of one or more mobile devices at least partially based on one or more pieces of calendar information obtainable from the one or more mobile devices.

For example, a user may enter a meeting in a calendar as comprised by his respective mobile device. For instance, user of the mobile device 130-4 may have entered in the mobile device 130-4 that a meeting takes place in meeting room 150-1-1 at a certain time and date. As shown in FIG. 1, users respectively mobile devices 130-1 to 130-3 are already in the meeting room. The users respectively mobile devices 130-1 to 130-3 do also attend the respective meeting. Out of one or more pieces of calendar information, e.g. obtained by server 110, one or more space identifiers, e.g. a space identifier of the meeting room 150-1-1 such as a character string representing the name of the meeting room 150-1-1 is extracted. Further, server 110 may for instance obtain (e.g. retrieve) an indoor map of the building 150, e.g. from the database 120. Then, it is analyzed (e.g. determined) whether one or more space identifiers as represented or comprised by the obtained radio map and associated with respective spaces (e.g. one or more meeting rooms) covered by the respective indoor map match with one or more space identifiers as extracted from the one or more pieces of calendar information. For instance, in case a position is to be determined of one of the mobile devices 130-1 to 130-4, the mobile devices 130-1 to 130-4 may for instance gather one or more pieces of fingerprint information, which may for instance be obtained (e.g. received) by the server 110. Then, based on the result of the determined match, a more accurate location estimate can be determined in a positioning since it is derived that e.g. mobile devices 130-1 to 130-4 take part in the meeting in meeting room 150-1-1. In case of the mobile device 130-4, the user of this mobile device may for instance be late for the meeting. Thus, in example embodiments of the method according to the first exemplary aspect of the present invention, a certain threshold for the start time and end time of the meeting taking place in meeting room 150-1-1 may for instance be factored in. For instance, after a lapse of a certain time period, one or more further pieces of fingerprint information may for instance be obtained from the mobile device 130-4. Then, in the meantime, the user of mobile device 130-4 may for instance have moved into meeting room 150-1-1 so that then based on the respective piece of calendar information, a reference location estimate representing the location of the meeting room 150-1-1 can be determined to be indicative of the position of the mobile device 130-4 respectively its user.

Figure 2:
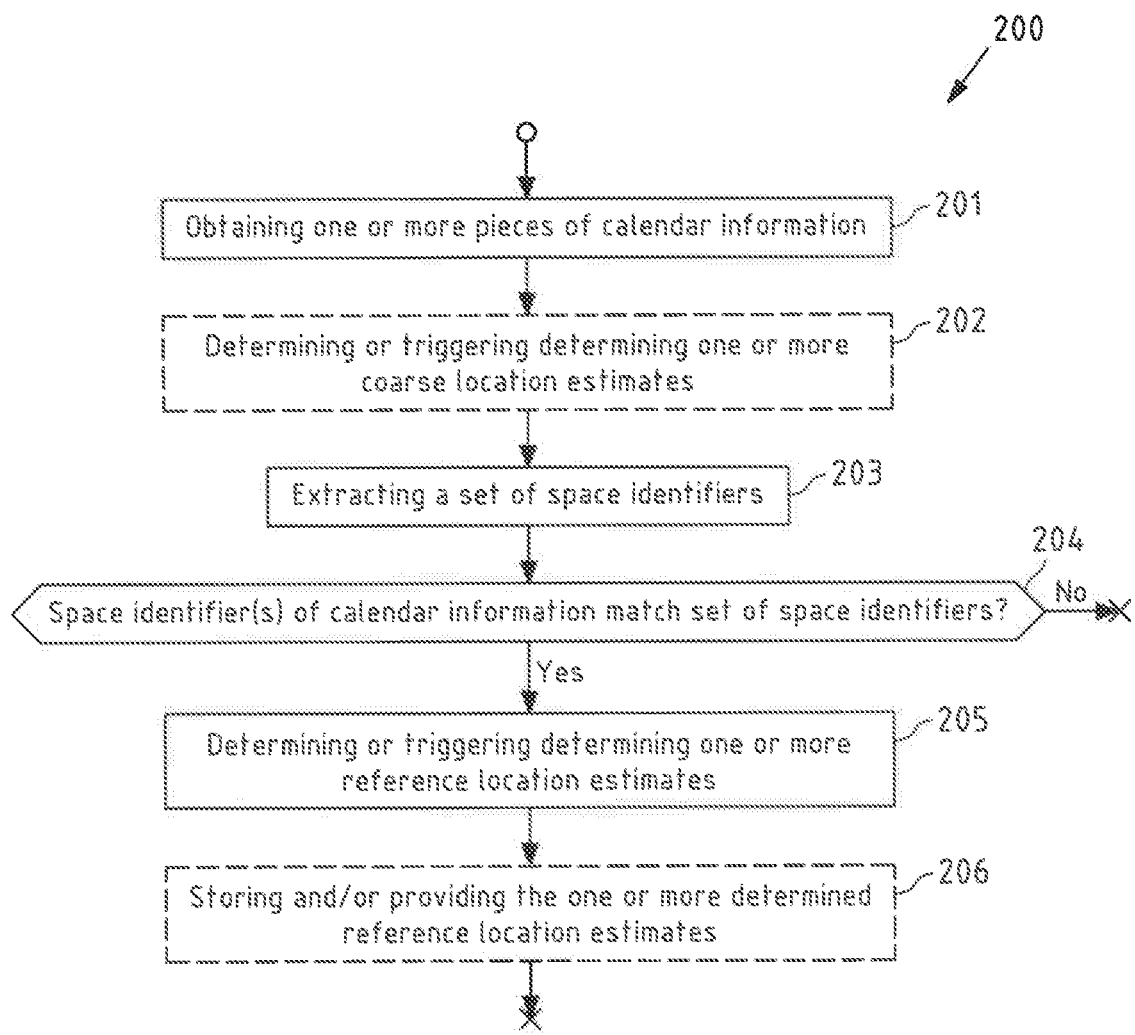
FIG. 2 a flowchart showing an example embodiment of a method according to the first exemplary aspect of the present invention.

FIG. 2 is a flowchart 200 showing an example embodiment of a method according to the first exemplary aspect of the present invention. This flowchart 200 may for instance be performed by a server, or a server cloud, and/or a mobile device, e.g. server 110, and/or one of the mobile devices 130-1 to 130-4 of FIG. 1.

In a first step 201, one or more pieces of calendar information are obtained. The one or more pieces of calendar information may for instance be obtained by receiving the one or more pieces of calendar information from one or more mobile devices (e.g. mobile devices 130-1 to 130-4 of FIG. 1) by the server. Further, the one or more pieces of calendar information may for instance be retrieved from a memory, e.g. in case flowchart 200 is performed and/or controlled by a respective mobile device of the one or more mobile devices.

In an optional second step 202, one or more coarse location estimates are determined (e.g. in case step 202 is performed and/or controlled by the server), or triggered to be determined (e.g. in case step 202 is performed and/or controlled by a respective mobile device). In the latter case, e.g. a request for determining a coarse location estimate is sent by the respective mobile device, e.g. to the server, or alternatively, to a positioning server providing determining of one or more coarse location estimate as a service. Of course, such a positioning server may for instance also provide (e.g. sent) the determined coarse location estimate to the server (e.g. server 110 of FIG. 1).

In a third step 203, a set of space identifiers is extracted. For instance, at first, such a set of space identifiers may for instance be extracted out of the one or more pieces of calendar information obtained in step 201. Then, at second, such a set of space identifiers may for instance be extracted out of an indoor map, e.g. an indoor map of the building 150 of FIG. 1. Then, in a fourth step 204 it is determined (e.g. checked or analyzed) whether or not there is match between those space identifiers derived from the one or more pieces of calendar information and the respective space identifiers derived from the indoor map. It will be understood that it may for instance also be possible that only a set of space identifiers is extracted out of an indoor map (e.g. obtained or retrieved from a memory, e.g. database 120 of FIG. 1). Then, the determining of the match may for instance be performed and/or controlled between the set of space identifiers and (e.g. directly) the one or more pieces of calendar information. Steps 203 and 204 may for instance be performed by the server, or by a respective mobile device in case the flowchart 200 is performed and/or controlled by a respective mobile device.

In case a match is found, the flowchart 200 may for instance continue with step 205. In case no match is found, the flowchart 200 may for instance not be continued to be performed and/or controlled.

In a fifth step 205, one or more reference location estimates are determined (e.g. in case step 205 is performed and/or controlled by the server) or triggered to be determined (e.g. in case step 205 is performed and/or controlled by a respective mobile device, and this mobile device e.g. request at a/the server to determine a respective reference location estimate). A respective reference location estimate may for instance be determined or triggered to be determined based on the match found in step 204 since a respective reference location estimate of the one or more reference location estimates is indicative of a location of the space that was determined to be a match (step 204), wherein the location to be represented by the respective reference location estimate of the one or more reference location estimates corresponds to the location of the space (found by the step 204) that is derived from the respective indoor map e.g. obtained as disclosed with respect to step 203.

In an optional sixth step 206, the one or more determined reference location estimates are stored and/or provided. The one or more determined reference location estimates may for instance be stored in a memory, e.g. comprised by or connectable to the apparatus performing and/or controlling the flowchart 200, e.g. a database such as database 120 of FIG. 1 in case the flowchart 200 is performed and/or controlled by the server 110 of FIG. 1. Further, the one or more determined reference location estimates may for instance be stored in a memory, e.g. comprised by or connectable to a respective mobile device in case the flowchart 200 is e.g. performed and/or controlled by one of the mobile devices 130-1 to 130-4 of FIG. 1.

The one or more determined reference location estimates may for instance be provided, e.g. to one or more further entities (e.g. not shown in FIG. 1), and/or to one or more mobile devices (e.g. one or more of the mobile devices 130-1 to 130-4 of FIG. 1) from the server 110 of FIG. 1, or to the server 110 of FIG. 1 from one or more mobile devices (e.g. one or more of the mobile devices 130-1 to 130-4 of FIG. 1). The one or more determined reference location estimates may for instance be provided by sending the one or more determined reference location estimates, e.g. directly to one or more intended recipients (to the one or more mobile devices, or to the server, see disclosure above), or to another entity that may for instance relay the one or more determined reference location estimates to one or more intended recipients.

Figure 3A:
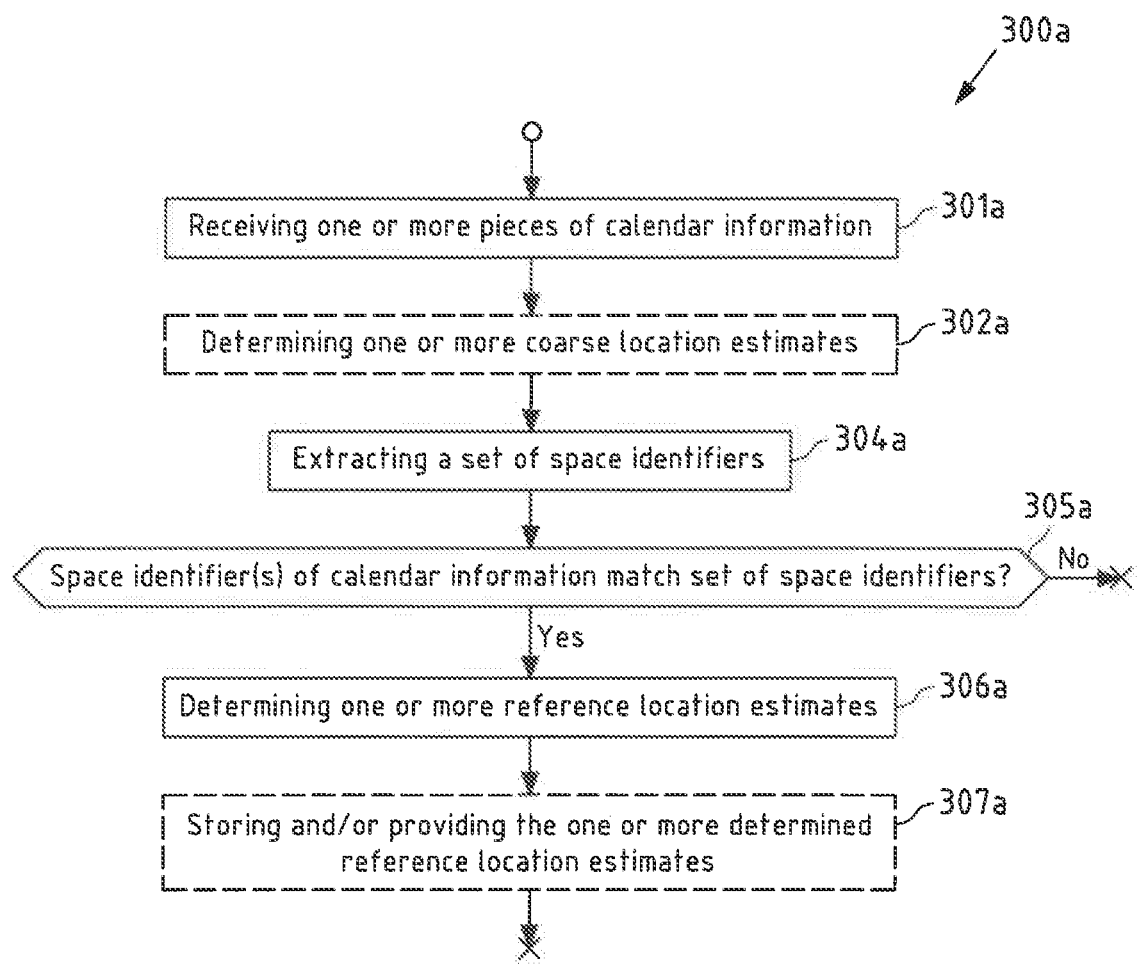
FIG. 3a, 3b respective flowcharts, each showing an example embodiment of a method according to the first exemplary aspect of the present invention.

FIG. 3*a* is a flowchart 300*a* showing an example embodiment of a method according to the first exemplary aspect of the present invention in case the method according to the first exemplary aspect of the present invention is performed and/or controlled by a server (e.g. server 110 of FIG. 1).

Figure 3B:
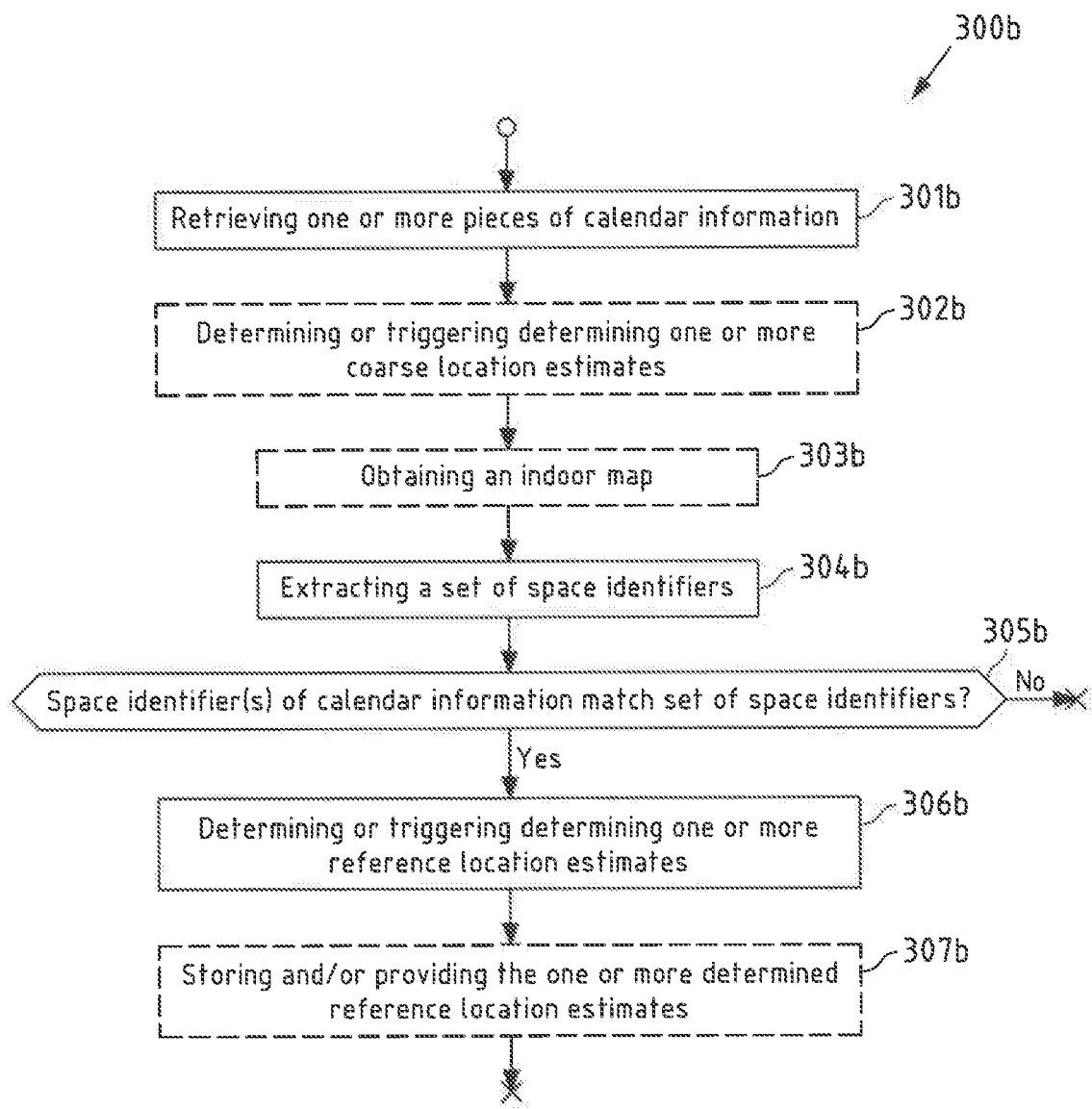

Further, FIG. 3*b* is a flowchart 300*b* showing an example embodiment of a method according to the first exemplary aspect of the present invention in case the method according to the first exemplary aspect of the present invention is performed and/or controlled by a mobile device (e.g. one of the mobile devices 130-1 to 130-4 of FIG. 1).

In the following, comparable steps as to be performed and/or controlled by a server or server cloud (flowchart 300*a* of FIG. 3*a*) or, in alternative, by a mobile device (flowchart 300*b* of FIG. 3*b*) are described in relation to each other, in particular pointing out the differences.

In a first step 301*b*, the one or more pieces of calendar information are retrieved, e.g. from a memory comprised by or connectable to the apparatus (e.g. mobile device) performing and/or controlling flowchart 300*a*. In contrast in step 301*a*, in case that the method according to the first exemplary aspect of the present invention is performed and/or controlled by a server, the one or more pieces of calendar information are received, e.g. from one or more mobile devices.

In an optional step 302*a*, the server determines one or more coarse location estimates. In contrast, in optional step 302*b* the one or more coarse location estimates may either be determined by the respective mobile device, or the respective mobile device may trigger (e.g. a server, such as server 110 of FIG. 1) to determine the one or more coarse location estimates.

In an optional step 303*b*, the respective mobile device obtains (e.g. receives) an indoor map (of a venue), e.g. in case such an indoor map of the venue was not obtained earlier.

In a step 304*a* respectively 304*b*, a set of space identifiers is extracted by the server respectively the respective mobile device. The extraction of the set of space identifiers can be performed and/or controlled in the same way as described with respect to step 203 of FIG. 2.

In a step 305a respectively 305b, it is determined (e.g. checked or analyzed) if one or more space identifiers of the calendar information (e.g. comprised or represented by the one or more pieces of calendar information) match e.g. one or more space identifiers of the set of space identifiers, as described with respect to step 204 of FIG. 2.

In a step 306a respectively 306b, one or more reference location estimates are determined by the server, or determined by the respective mobile device, or alternatively, triggered by the respective mobile device, e.g. to be determined by a server, such as server 110 of FIG. 1.

In an optional step 307a respectively 307b, the one or more determined reference location estimates are stored (e.g. in a memory respectively comprised by or connectable to the server, or the respective mobile device). Additionally or alternatively, the one or more determined reference location estimates may for instance be provided (e.g. sent) to one or more other entities, in the same way as described with respect to step 206 of FIG. 2

Figure 4:
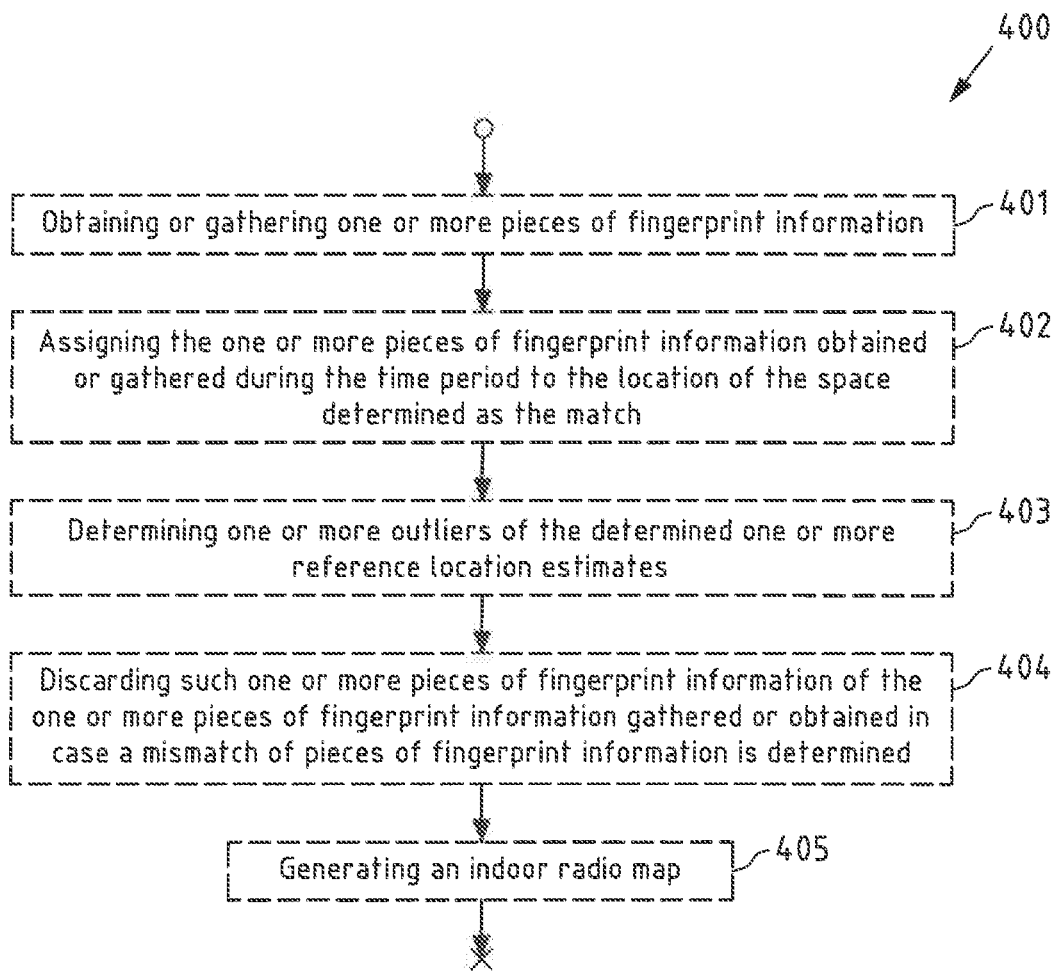
FIG. 4 a flowchart showing an example embodiment of a method according to the first exemplary aspect of the present invention, which may for instance be performed and/or controlled in addition to any of the flowcharts shown in FIG. 2, and/or FIG. 3a, 3b.

FIG. 4 is a flowchart 400 showing an example embodiment of a method according to the first exemplary aspect of the present invention, which may for instance be performed and/or controlled in addition to any of the flowcharts shown in FIG. 2, and/or FIG. 3a, 3b. Flowchart 400 may for instance be performed and/or controlled by the respective apparatus also performing and/or controlling the respective flowchart 200, 300a, 300b of FIG. 2, 3a, 3b.

All of the steps 401 to 405 are optional steps. Further, all of the steps 401 to 405 may for instance be performed and/or controlled prior and/or subsequential to, and/or in parallel to any of the steps as comprised by the flowcharts 200, 300a, 300b of FIG. 2, 3a, 3b. It will further be understood that any of the steps 401 to 405 may for instance be performed and/or controlled one or more times (e.g. a plurality of times).

In a step 401, one or more pieces of fingerprint information are obtained (e.g. received in case step 401 is performed and/or controlled by a server (e.g. server 110 of FIG. 1). Alternatively, the one or more pieces of fingerprint information are gathered (e.g. measured) in case step 401 is performed and/or controlled by a respective mobile device (e.g. one of the mobile devices 130-1 to 130-4 of FIG. 1).

In a step 402, the one or more pieces of fingerprint information of step 401 are assigned to a/the respective location of a/the space determined as a/the match in any of the steps 204 of FIG. 2, 305a of FIG. 3a, and/or 305b of FIG. 3b. The assigning may for instance be stored, e.g. in a memory. The memory may for instance be the same memory as used in step 206 o FIG. 2, 307a of FIG. 3a and/or 307b of FIG. 3b for storing the one or more determined reference location estimates.

In a step 403, one or more outliers are determined at least partially based on the one or more reference location estimates (see step 205 of FIG. 2, step 306a of FIG. 3a, step 306b of FIG. 3b).

In a step 404, e.g. based on the result(s) of step 403, such one or more pieces of fingerprint information (see step 401) that e.g. do not match other pieces of fingerprint information are discarded. For instance, one or more pieces of fingerprint information may for instance comprise or represent identifiers of one or more radio nodes basically gathered at the same location (e.g. same space of an area and/or a venue) and gathered by different mobile devices do not match. Then, such one or more pieces of fingerprint information not matching may for instance be discarded (e.g. by deleting the respective one or more pieces of fingerprint information, to name but one non-limiting example).

In a step 405, an indoor radio map is generated (e.g. determined or created). For instance, in case an indoor radio map for a certain area and/or venue is available, the indoor radio map generated in step 405 may for instance update the previous one. The indoor radio map of step 405 may for instance be more accurate since e.g. certain match(es) determined (see step 204 of FIG. 2, 305a of FIG. 3a, 305b of FIG. 3b) and/or one or more pieces of reference location estimates (see step 205 of FIG. 2, 306a of FIG. 3a, 306b of FIG. 3b) may for instance be considered and be comprised or represented respectively in the generated indoor radio map.

Figure 5:
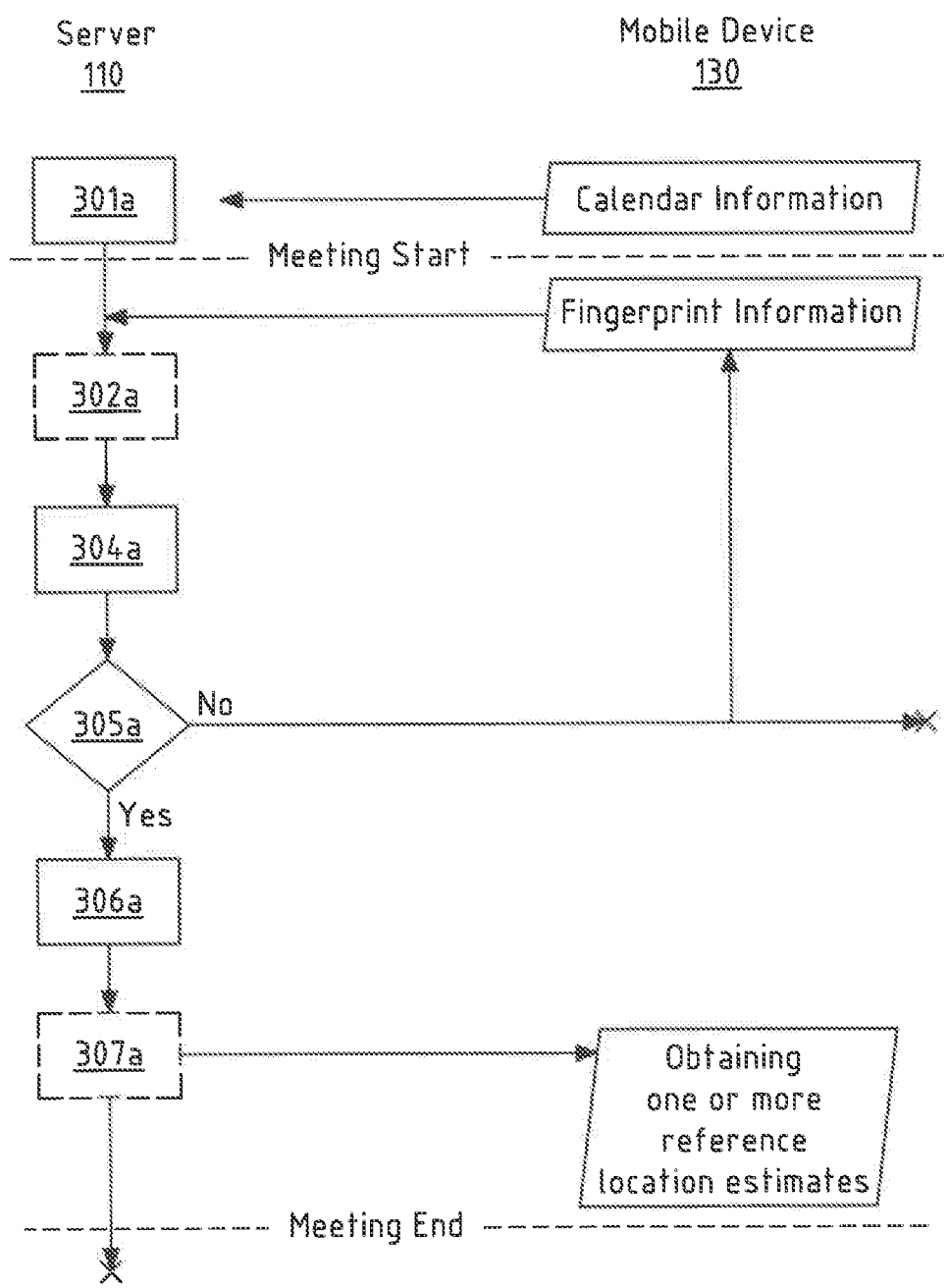
FIG. 5 a flowchart showing an example embodiment that may for instance be performed and/or controlled by a system according to an exemplary aspect of the present invention.

FIG. 5 is a flowchart 500 showing an example embodiment of a method according to the first exemplary aspect of the present invention that is to be performed and/or controlled by a system according to example embodiments of all exemplary aspects of the present invention. For instance, flowchart 500 may for instance be performed and/or controlled by the system 100 shown in FIG. 1.

In FIG. 5, a system such as system 100 of FIG. 1 performing and/or controlling an example embodiment according to all exemplary aspects of the present invention is shown. As shown in FIG. 5, a server such as server 110 of FIG. 1 performs and/or controls the method of the first exemplary aspect of the present invention. One or more mobile devices which respective steps are shown from top to bottom on the right hand side as a column view in FIG. 5. It will be understood that a plurality of mobile devices (e.g. at least two mobile devices) may for instance interact with the server, which steps to be performed and/or controlled are shown from top to bottom on the left hand side as a column view in FIG. 5.

The steps performed and/or controlled by the server (e.g. server 110 of FIG. 1) are referenced to by the same reference numerals as shown in flowchart 300a of FIG. 3a. The server 110 obtains one or more pieces of calendar information from the respective mobile device (e.g. one of the mobile devices 130 of FIG. 1), or from a plurality of mobile devices (e.g. mobile devices 130-1 to 130-4 of FIG. 1). The one or more pieces of calendar information may for instance be obtained (e.g. received) at any given time, as indicated in FIG. 5 by the horizontal dashed line "Meeting Start" so that the one or more pieces of calendar information may for instance be sent by the respective mobile device(s) 130 prior to a meeting to the server 110.

Then, after a meeting has started, one or more pieces of fingerprint information may for instance be gathered (e.g. measured) by the respective mobile device(s) 130 and then provided (e.g. sent) from the respective mobile device(s) 130 to the server 110.

The server 110 can then perform optional step 302a of determining one or more coarse location estimates, e.g. at least partially based on the one or more pieces of fingerprint information obtained (e.g. received) from the respective mobile device(s) 130.

Then, the server 110 can extract a set of space identifiers out of the one or more pieces of calendar information, as indicated by reference numeral 304a. It will be understood that this step 304a can be performed earlier, e.g. after obtaining the one or more pieces of calendar information, and/or prior to the meeting start, to name but a few non-limiting examples.

As indicated by reference numeral 305a, the server 110 determines (e.g. checks or analyzes) if one or more space identifiers of the calendar information (e.g. comprised or represented by the one or more pieces of calendar information) match one or more space identifiers of the set of space identifiers, e.g. as extracted out of an indoor map of an area and/or venue. In case such a match is not determined (e.g. found), the flowchart of FIG. 5 may for instance end, or alternatively, one or more (e.g. new or further) pieces of fingerprint information may for instance be requested to be obtained from the respective mobile device(s) 130.

In case such a match is determined, step 306a can be performed and/or controlled by the server 110 so that the server 110 determines one or more reference location estimates being indicative of a location of a space in an area and/or venue (e.g. venue 150 of FIG. 1).

In an optional step 307a, the one or more reference location estimates of step 306a can be stored in a memory (e.g. comprised by or connectable to the server 110). Additionally or alternatively, the one or more reference location estimates of step 306a may for instance be provided (e.g. output or sent), e.g. to the respective mobile device(s) 130 so that the respective mobile device(s) 130 can obtain (e.g. receive) the respective one or more reference location estimates as determined by the server 110.

At any time subsequential to the meeting start, the meeting can end. Exemplary, the end of the meeting is indicated in FIG. 5 after optional step 307a is performed and/or controlled by server 110.

Figure 6:
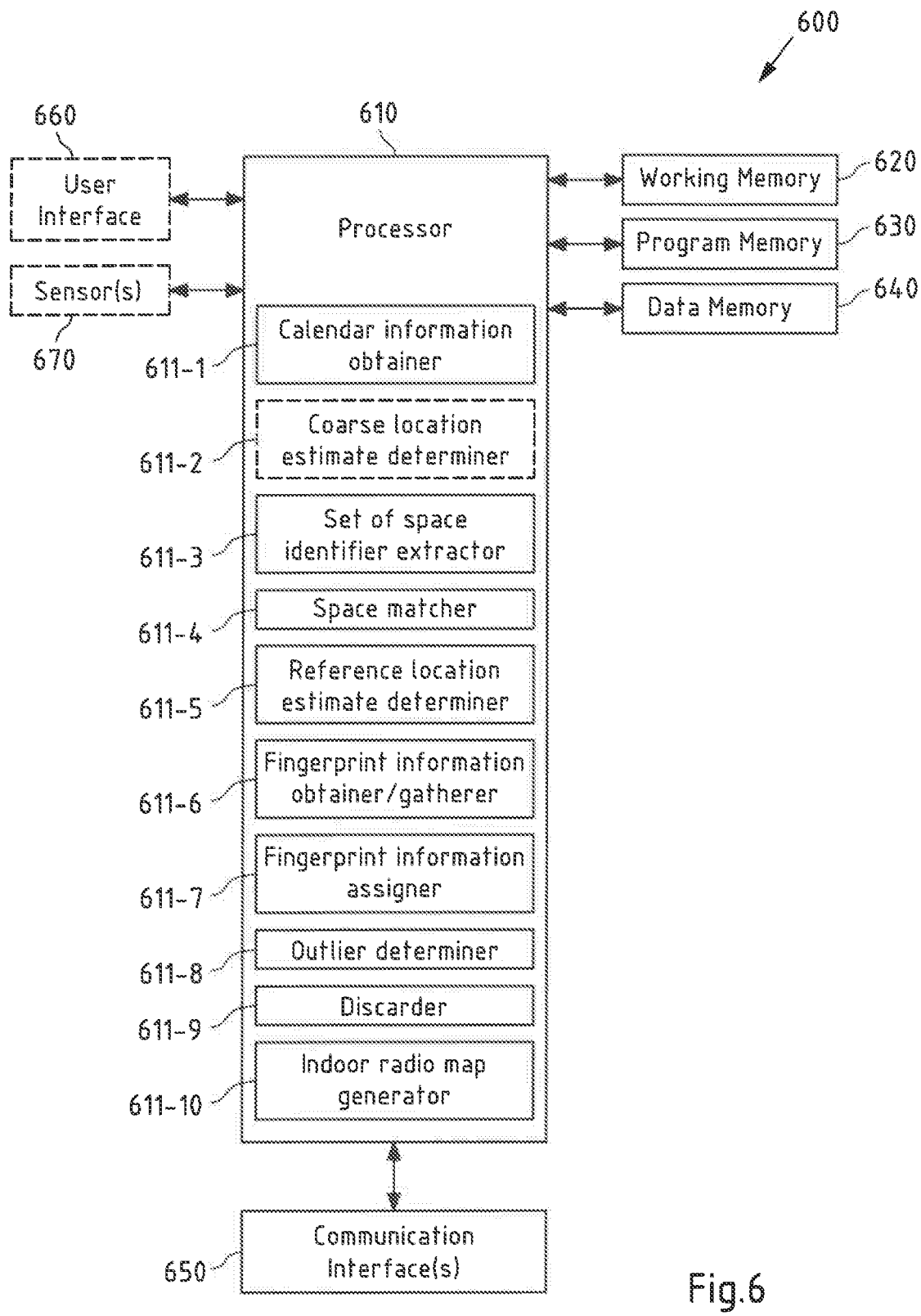
FIG. 6 a schematic block diagram of an apparatus configured to perform the method according to the first exemplary aspect of the present invention.

FIG. 6 is a schematic block diagram of an apparatus 600 according to an exemplary aspect of the present invention, which may for instance represent server 110 of FIG. 1. Alternatively, the schematic block diagram of the apparatus 600 according to an exemplary aspect of the present invention may for instance represent one of the mobile devices 130-1 to 130-4 of FIG. 1.

Apparatus 600 comprises a processor 610, working memory 620, program memory 630, data memory 640, communication interface(s) 650, an optional user interface 660. In case apparatus 600 represents one of the mobile devices 130-1 to 130-4 of FIG. 1, sensor(s) 670 can optionally be comprised.

Apparatus 600 may for instance be configured to perform and/or control or comprise respective means (at least one of 610 to 670) for performing and/or controlling the method according to the first exemplary aspect of the present invention. Apparatus 600 may as well constitute an apparatus comprising at least one processor (610) and at least one memory (620) including computer program code, the at least one memory and the computer program code configured to, with the at least one processor, cause an apparatus, e.g. apparatus 600 at least to perform and/or control the method according to the first exemplary aspect of the invention of the present invention.

Processor 610 may for instance comprise a calendar information obtainer 611-1 as a functional and/or structural unit. Calendar information obtainer 611-1 may for instance be configured to obtain one or more pieces of calendar information (see step 201 of FIG. 2, step 301a of FIG. 3a, step 301b of FIG. 3b).

Processor 610 may for instance comprise an optional coarse location estimate determiner 611-2 as a functional and/or structural unit. Optional coarse location estimate determiner 611-2 may for instance be configured to determine one or more coarse location estimates (see step 202 of FIG. 2, step 302a of FIG. 3a, step 302b of FIG. 3b).

Processor 610 may for instance comprise a set of space identifier extractor 611-3 as a functional and/or structural unit. Set of space identifier extractor 611-3 may for instance be configured to extract one or more sets of space identifiers (see step 203 of FIG. 2, step 304a of FIG. 3a, step 304b of FIG. 3b).

Processor 610 may for instance comprise a space matcher 611-4 as a functional and/or structural unit. Space matcher 611-4 may for instance be configured to match or check whether one or more space identifiers of one or more pieces of calendar information match one or more sets of space identifier (e.g. an extracted set of space identifiers of set of space identifier extractor 611-3; see step 204 of FIG. 2, step 305a of FIG. 3a, step 305b of FIG. 3b).

Processor 610 may for instance comprise a reference location estimate determiner 611-5 as a functional and/or structural unit. Reference location estimate determiner 611-5 may for instance be configured to determine one or more reference location estimates (see step 205 of FIG. 2, step 306a of FIG. 3a, step 306b of FIG. 3b).

Processor 610 may for instance comprise an optional fingerprint information obtainer/gatherer 611-6 as a functional and/or structural unit. Optional fingerprint information obtainer/gatherer 611-6 may for instance be configured to obtain and/or gather one or more pieces of fingerprint information (see step 401 of FIG. 4).

Processor 610 may for instance comprise an optional fingerprint information assigner 611-7 as a functional and/or structural unit. Optional fingerprint information assigner 611-7 may for instance be configured to assign one or more pieces of fingerprint to one or more locations of one or more determined spaces (see step 402 of FIG. 4).

Processor 610 may for instance comprise an optional outlier determiner 611-8 as a functional and/or structural unit. Optional outlier determiner 611-8 may for instance be configured to determine one or more outliers of one or more determined reference location estimates (see step 403 of FIG. 4).

Processor 610 may for instance comprise an optional discarder 611-9 as a functional and/or structural unit. Optional discarder 611-9 may for instance be configured to discard one or more pieces of fingerprint information (see step 404 of FIG. 4).

Processor 610 may for instance comprise an optional indoor radio map generator 611-10 as a functional and/or structural unit. Optional indoor radio map generator 611-10 may for instance be configured to generate (e.g. determine or create) one or more indoor radio maps (see step 405 of FIG. 4).

Processor 610 may for instance further control the memories 620 to 640, the communication interface(s) 650, the optional user interface 660 and the optional sensor(s) 670.

Processor 610 may for instance execute computer program code stored in program memory 630, which may for instance represent a computer readable storage medium comprising program code that, when executed by processor 610, causes the processor 610 to perform the method according to the first exemplary aspect of the present invention.

Processor 610 (and also any other processor mentioned in this specification) may be a processor of any suitable type. Processor 610 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 610 may for instance be an application processor that runs an operating system.

Program memory 630 may also be included into processor 610. This memory may for instance be fixedly connected to processor 610, or be at least partially removable from processor 610, for instance in the form of a memory card or stick. Program memory 630 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 630 may also comprise an operating system for processor 610. Program memory 630 may also comprise a firmware for apparatus 600.

Apparatus 600 comprises a working memory 620, for instance in the form of a volatile memory. It may for instance be a Random Access Memory (RAM) or Dynamic RAM (DRAM), to give but a few non-limiting examples. It may for instance be used by processor 610 when executing an operating system and/or computer program.

Data memory 640 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 640 may for instance store one or more pieces of calendar information, one or more coarse location estimates, one or more sets of space identifiers, one or more reference location estimates, one or more pieces of fingerprint information, one or more outliers, one or more indoor radio maps, one or more radio maps, to name but a few non-limiting examples.

Communication interface(s) 650 enable apparatus 600 to communicate with other entities, e.g. with server 110 of FIG. 1 in case apparatus 600 represents one of the mobile devices 130-1 to 130-4 of FIG. 1. Communication interface(s) 650 enable apparatus 600 to communicate with other entities, e.g. with one of the mobile devices 130-1 to 130-4 of FIG. 1 in case apparatus 600 represents server 110 of FIG. 1. The communication interface(s) 650 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 600 to communicate with other entities, for instance with one or more radio nodes, or with one or more base stations of a cellular communication network, or the like, to name but a few non-limiting examples.

User interface 660 is optional and may comprise a display for displaying information to a user and/or an input device (e.g. a keyboard, keypad, touchpad, mouse, etc.) for receiving information from a user.

Sensor(s) 670 are optional and may for instance comprise a gyroscope, an accelerometer, an inertial sensor, barometric sensor, e.g. to gather (e.g. measure) respective information e.g. indicative of a position and/or orientation and/or velocity of the apparatus 600 in its surrounding, and/or an (e.g. absolute or relative) altitude value of the apparatus 600, to name but a few non-limiting examples. Sensor(s) 670 may for instance be comprised by the apparatus 600 in case apparatus 600 represents one of the mobile devices 130 of FIG. 1.

Some or all of the components of the apparatus 600 may for instance be connected via a bus. Some or all of the components of the apparatus 600 may for instance be combined into one or more modules.

The following embodiments shall also be considered to be disclosed:

Embodiment 1

An apparatus comprising at least one processor and at least one memory including computer program code, the at least one memory and the computer program code configured to, with the at least one processor, cause the apparatus to at least perform:
 obtaining one or more pieces of calendar information indicative of at least one appointment taking place in a space;
 extracting a set of space identifiers representing one or more spaces of the venue, wherein the one or more spaces respectively their one or more space identifiers are extracted based on an indoor map of the venue;
 determining or triggering determining whether at least a part of the set of space identifiers or one or more spaces of the set of space identifiers matches or match the at least one space as represented by the obtained one or more pieces of calendar information; and in case such a match is found:
 determining one or more reference location estimates, wherein a respective reference location estimate of the one or more reference location estimates is indicative of a location of the space that was determined to be a match, wherein the location of the space is derived from the indoor map.

Embodiment 2

The apparatus according to embodiment 1, the at least one memory and the computer program code configured to, with the at least one processor, cause the apparatus further to perform:
 determining or triggering determining one or more coarse location estimates.

Embodiment 3

The apparatus according to any of the preceding embodiments, wherein the calendar information is further indicative of a time period of the at least one appointment.

Embodiment 4

The apparatus according to any of the preceding embodiments, wherein the calendar information is associated with a user of a mobile device.

Embodiment 5

The apparatus according to any of the preceding embodiments, wherein the space of the venue is represented by a character string.

Embodiment 6

The apparatus according to any of the embodiments 3 to 5, wherein the determining of the one or more coarse location estimates further comprises:
 obtaining or gathering one or more pieces of fingerprint information, wherein the obtaining or the gathering is performed and/or controlled during the time period of the at least one appointment; and wherein the one or more coarse location estimates are determined at least partially based on the one or more pieces of fingerprint information.

Embodiment 7

The apparatus according to embodiment 6, wherein the set of space identifiers is extracted further based on the one or more coarse location estimates, wherein the set of space identifiers comprises one or more spaces located in the vicinity of the one or more coarse location estimates.

Embodiment 8

The apparatus according to any of the preceding embodiments, the at least one memory and the computer program code configured to, with the at least one processor, cause the apparatus further to perform:
  storing and/or providing the determined one or more reference location estimates to be utilized as reference for further sensor data.

Embodiment 9

The apparatus according to embodiment 8, wherein the storing and/or providing the determined one or more reference location estimates to be utilized as reference for further sensor data further comprises:
  assigning the one or more pieces of fingerprint information obtained or gathered during the time period to the location of the space determined as the match.

Embodiment 10

The apparatus according to any of the embodiments 6 to 9, the at least one memory and the computer program code configured to, with the at least one processor, cause the apparatus further to perform:
  determining one or more outliers of the determined one or more reference location estimates at least partially based on a comparison of one or more pieces of fingerprint information obtained from one or more further mobile devices with the one or more pieces of fingerprint information gathered or obtained; and
  discarding such one or more pieces of fingerprint information of the one or more pieces of fingerprint information gathered or obtained in case a mismatch of pieces of fingerprint information is determined by the comparison.

Embodiment 11

The apparatus according to any of the embodiments 6 to 10, the at least one memory and the computer program code configured to, with the at least one processor, cause the apparatus further to perform:
  storing and/or providing the respective pieces of fingerprint information based on which the one or more reference location estimates were determined.

Embodiment 12

The apparatus according to any of the embodiments 6 to 11, the at least one memory and the computer program code configured to, with the at least one processor, cause the apparatus further to perform:
  generating an indoor radio map at least partially based on the one or more reference location estimates, and on the respective pieces of fingerprint information.

Embodiment 13

The apparatus according to any of the preceding embodiments, wherein the indoor radio map comprises or represents one or more defined location information of the one or more spaces located within the venue.

Embodiment 14

An apparatus comprising at least one processor and at least one memory including computer program code, the at least one memory and the computer program code configured to, with the at least one processor, cause an apparatus at least to perform and/or control the method of any of the claims 1 to 13.

Embodiment 15

A tangible computer-readable medium storing computer program code, the computer program code when executed by a processor causing an apparatus to perform and/or control:
  obtaining one or more pieces of calendar information indicative of at least one appointment taking place in a space;
  extracting a set of space identifiers representing one or more spaces of the venue, wherein the one or more spaces respectively their one or more space identifiers are extracted based on an indoor map of the venue;
  determining or triggering determining whether at least a part of the set of space identifiers or one or more spaces of the set of space identifiers matches or match the at least one space as represented by the obtained one or more pieces of calendar information; and in case such a match is found:
  determining one or more reference location estimates, wherein a respective reference location estimate of the one or more reference location estimates is indicative of a location of the space that was determined to be a match, wherein the location of the space is derived from the indoor map.

Embodiment 16

A tangible computer-readable medium storing computer program code, the computer program code when executed by a processor causing an apparatus to perform and/or control the method of any of the claims 1 to 13.

Example embodiments according to all exemplary aspect of the present invention enable a non-real-time method e.g. for deducing the location (=numerical representation of location in terms of e.g. Lat/Lon/venue/floor) of a device based on
  the space information (e.g. space identifier) from the user calendar (represented by one or more pieces of calendar information), e.g. being indicative of where the user of a respective mobile device is supposed to be and when; and
  information about the locations of the meeting rooms, lecture/class rooms, which location information may for instance be extracted from one or more indoor maps.

Information about person's meetings/appointments/lectures/classes/seminars with the time detailed information about the space, for instance where e.g. the meeting is, exists in various kind of software applications (e.g. Outlook, Google calendar, etc.) such information may include at least time of the event and name of the space of the event (e.g. meeting room name).

Also, there exist various indoor maps, e.g. provided by HERE, which contain names of the spaces/meeting rooms; lecture rooms etc.

According to the proposed method 1. the name SNameA of the space for the appointment is determined based on the calendar information 2. at the time of appointment device determines its coarse location 3. A set of space names {SName1, SName2, . . . } and their locations {SLocation1, SLocation2, . . . } are extracted from the indoor maps for the vicinity of the device coarse location 4. extracted space names {SName1, SName2, . . . } are compared against the SNameA of the space of the user appointment 5. if one of the extracted space names SNamei match with the name SNameA, user is at the location of the space associated with the matching name. This provides the numerical (e.g. Lat/Lon/floor) information about the user location.

6. The estimated location of the device during appointment is used to reference device sensor data, such as Wi-Fi/BLE/cellular measurements. Georeferenced radio measurements be used for e.g. radio map generation for indoor positioning.

In summary, this method provides a way to learn georeferenced radio measurements from indoors, where traditional positioning methods fail.

The steps of the proposed respectively above disclosed method will be explained in detail below:

1. Obtain information about the user appointment, including:
time period of the appointment [TimeAstart, TimeAend]
Name of the appointment space SNameA (e.g. a meeting room name)

2. Collect and store sensor data from the user device during the time period [TimeAstart, TimeAend], particularly Wi-Fi and BLE measurements 3. Determine coarse device locations [XTimeA1, XTimeA2, . . . ] during the time of appointment based on GNSS/Wi-Fi/cellular signals. It is noted that this step only facilitates the further search but is not strictly necessary, it is also possible that location of the space already exist in the meeting details).

4. Obtain list of spaces {Space1, Space2, . . . } located in the vicinity of locations [XTimeA1, XTimeA2, . . . XTimeAK]. The list consists of the space names {SName1, SName2, . . . } and space locations {SLocation1, SLocation2, . . . }. The list is obtained from the indoor map. Circle of pre-defined radius around median of locations [XTimeA1, XTimeA2, . . . XTimeAK] can be considered as the area of proximity.

5. Find SNamei that matches with SNameA using string-matching methods. For instance, such SNamei whose substring SNamei* match exactly with sufficiently long substring SNameA*of SNameA. If no matching names found, do not proceed with further steps.

6. If space with matching name SNamei is found, the Spacei is the space of a user appointment and the location SLocationi is the location of the user and hence the user device during the time of the appointment [TimeAstart, TimeAend].

It is noted that to account for a user to come to the meeting later or leaving earlier from the meeting can be account for by considered a small time interval [TimeAstart+dt, TimeAend−dt]. Additionally, sensor data can be used to estimate the time when user is in the meeting. This can be done by considering only the time periods when user does not move significantly or does not make steps, according to acceleration measurements.

7. Determine locations of the measurements collected by the device during time [TimeAstart+dt, TimeAend−dt] to be the location SLocationi of the space Spacei. Also, assign measurements collected by the device during the time [TimeAstart+dt, TimeAend−dt] to the location SLocationi of the space Spacei as well as to the space Spacei.

8. Remove the measurements outliers. This can be done by comparing the measurements made by the device during the time [TimeAstart+dt, TimeAend−dt] with the measurements already associated with Spacei/SLocationi. For example, if measurement shows mismatch with enough measurements already associated with the Spacei/SLocationi, then such a measurement can be discarded. If proportion of discarded measurements during time period [TimeAstart+dt, TimeAend−dt] exceeds pre-defined thresholds, all the device measurements from [TimeAstart+dt, TimeAend−dt] can be discarded. As an example, Wi-Fi/BLE measurements can be compared/matched in terms of Euclidean norm between the measurements vectors.

9. Device measurements whose reference is determined to be equal to the location SLocationi of the Spacei as well as the measurements contextually assigned to the Spacei can be further used for generating a radio map in the proximity of the Spacei.

Alternatively, such measurements can be used to determine which Wi-Fi/BLE radio nodes are located in a close proximity to the Spacei or located inside Spacei.

Figures 7, 8:
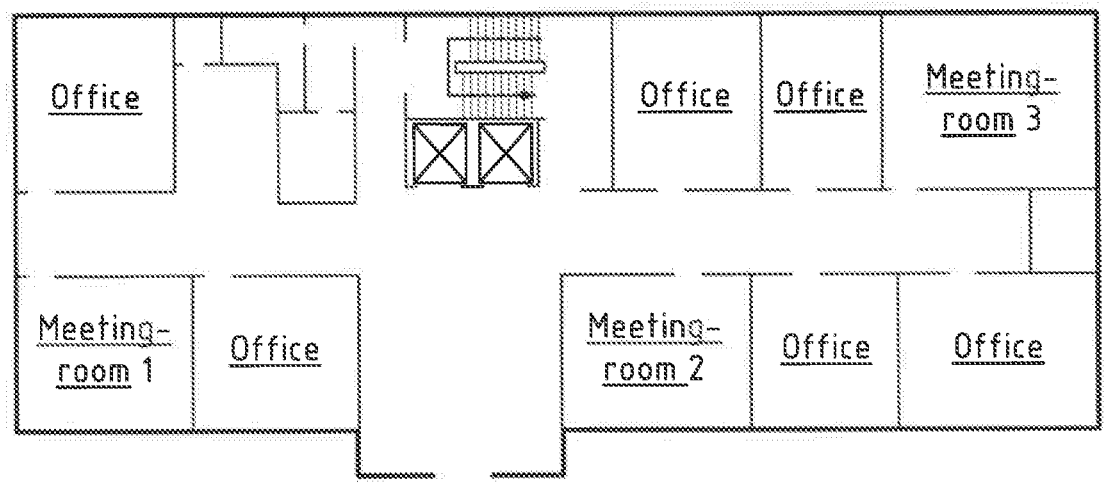
FIG. 7 an indoor map as used by example embodiment according to all exemplary embodiments of the present invention.
FIG. 8 user calendar information as used by example embodiment according to all exemplary embodiments of the present invention.

FIG. 7 shows a venue map (e.g. indoor map) and example data from a calendar that can be used by the method as presented. Based on the information from the venue map presented on the FIG. 7, and user calendar information presented in the FIG. 8, it is possible to determine location of the user within a building during time of the appointments:

Meeting room 1 (South-west corner), 17:00-18:00, 22.03.2019
Meeting room 2 (South-central part), 18:00-19:00, 22.03.2019
Meeting room 3 (North-east corner), 19:00-20:00, 22.03.2019

Therefore, geo-reference Wi-Fi/Bluetooth radio data can be collected at these spaces by the user devices during the indicated times.

Example embodiments according to all aspects of the present invention provide additional means for device localization in indoor environments. Potentially improves indoor positioning in "smart office" applications. The Example embodiments enable in particular improved indoor positioning results in case the area of the space is small, such as in an office building.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

That which is claimed is:

1. A method, comprising:
   obtaining one or more pieces of calendar information indicative of at least one appointment taking place in at least one space;
   extracting a set of space identifiers from an indoor map of a venue, wherein each space identifier of the set of space identifiers represents a respective one or more spaces of the venue;
   determining or triggering determining whether one or more space identifiers of the set of space identifiers matches the at least one space as represented by the obtained one or more pieces of calendar information; and
   responsive to determining that a space identifier of the set of space identifiers matches the at least one space, determining one or more reference location estimates, wherein a respective reference location estimate of the one or more reference location estimates is indicative of a location of the space that was determined to match the space identifier, wherein the location of the space is derived from the indoor map.

2. The method according to claim 1, further comprising:
   determining or triggering determining one or more coarse location estimates, wherein a respective coarse location estimate of the one or more coarse location estimates corresponds to a plurality of spaces of the one or more spaces of the venue.

3. The method according to claim 1, wherein the calendar information is further indicative of a time period of the at least one appointment.

4. The method according to claim 3, further comprising determining or triggering determining one or more coarse location estimates, wherein a respective coarse location estimate of the one or more coarse location estimates corresponds to a plurality of spaces of the one or more spaces of the venue, wherein the determining of the one or more coarse location estimates further comprises:
   obtaining or gathering one or more pieces of fingerprint information, wherein the obtaining or the gathering is performed and/or controlled during the time period of the at least one appointment; and
   wherein the one or more coarse location estimates are determined at least partially based on the one or more pieces of fingerprint information.

5. The method according to claim 4, wherein the set of space identifiers is extracted further based on the one or more coarse location estimates, and wherein the set of space identifiers comprises one or more spaces located in the vicinity of the one or more coarse location estimates.

6. The method according to claim 4, further comprising:
   determining one or more outliers of the determined one or more reference location estimates at least partially based on a comparison of one or more pieces of fingerprint information obtained from one or more further mobile devices with the one or more pieces of fingerprint information gathered or obtained; and
   discarding such one or more pieces of fingerprint information of the one or more pieces of fingerprint information gathered or obtained in case a mismatch of pieces of fingerprint information is determined by the comparison.

7. The method according to claim 4, further comprising:
   storing and/or providing the respective pieces of fingerprint information based on which the one or more reference location estimates were determined.

8. The method according to claim 4, further comprising:
   generating an indoor radio map at least partially based on the one or more reference location estimates, and on the respective pieces of fingerprint information.

9. The method according to claim 1, wherein the calendar information is associated with a user of a mobile device.

10. The method according to claim 1, wherein the space of the venue is represented by a character string.

11. The method according to claim 1, further comprising:
storing and/or providing the determined one or more reference location estimates to be utilized as reference for further sensor data.

12. The method according to claim 11, wherein the calendar information is further indicative of a time period of the at least one appointment and the storing and/or providing the determined one or more reference location estimates to be utilized as reference for further sensor data further comprises:
obtaining or gathering one or more pieces of fingerprint information, wherein the obtaining or the gathering is performed and/or controlled during the time period of the at least one appointment and
assigning the one or more pieces of fingerprint information obtained or gathered during the time period to the location of the space determined as the match.

13. The method according to claim 1, wherein the indoor radio map comprises or represents one or more defined location information of the one or more spaces located within the venue.

14. An apparatus comprising at least one processor and at least one memory including computer program code, the at least one memory and the computer program code configured to, with the at least one processor, cause the apparatus at least to:
obtain one or more pieces of calendar information indicative of at least one appointment taking place in a space;
extract a set of space identifiers from an indoor map of a venue, wherein each space identifier of the set of space identifiers represents a respective one or more spaces of the venue;
determine or trigger determining whether one or more space identifiers of the set of space identifiers matches the at least one space as represented by the obtained one or more pieces of calendar information; and
responsive to determining that a space identifier of the set of space identifiers matches the at least one space, determine one or more reference location estimates, wherein a respective reference location estimate of the one or more reference location estimates is indicative of a location of the space that was determined to match the space identifier, wherein the location of the space is derived from the indoor map.

15. The apparatus according to claim 14, wherein the calendar information is further indicative of a time period of the at least one appointment, and wherein the at least one memory and the computer program code are configured to, with the at least one processor, cause the apparatus determine of the one or more coarse location estimates by:
obtaining or gathering one or more pieces of fingerprint information, wherein the obtaining or the gathering is performed and/or controlled during the time period of the at least one appointment; and
wherein the one or more coarse location estimates are determined at least partially based on the one or more pieces of fingerprint information, wherein a respective coarse location estimate of the one or more coarse location estimates corresponds to a plurality of spaces of the one or more spaces of the venue.

16. The apparatus according to claim 15, wherein the set of space identifiers is extracted further based on the one or more coarse location estimates, and wherein the set of space identifiers comprises one or more spaces located in the vicinity of the one or more coarse location estimates.

17. The apparatus according to claim 15, wherein the at least one memory and the computer program code are further configured to, with the at least one processor, cause the apparatus to:
determine one or more outliers of the determined one or more reference location estimates at least partially based on a comparison of one or more pieces of fingerprint information obtained from one or more further mobile devices with the one or more pieces of fingerprint information gathered or obtained; and
discard such one or more pieces of fingerprint information of the one or more pieces of fingerprint information gathered or obtained in case a mismatch of pieces of fingerprint information is determined by the comparison.

18. A tangible non-transitory computer-readable medium storing computer program code, the computer program code when executed by a processor causing an apparatus to perform and/or control:
obtain one or more pieces of calendar information indicative of at least one appointment taking place in a space;
extract a set of space identifiers from an indoor map of a venue, wherein each space identifier of the set of space identifiers represents a respective one or more spaces of the venue;
determine or trigger determining whether one or more space identifiers of the set of space identifiers matches the at least one space as represented by the obtained one or more pieces of calendar information; and
responsive to determining that a space identifier of the set of space identifiers matches the at least one space, determine one or more reference location estimates, wherein a respective reference location estimate of the one or more reference location estimates is indicative of a location of the space that was determined to match the space identifier, wherein the location of the space is derived from the indoor map.

19. The tangible computer-readable medium according to claim 18, wherein the calendar information is further indicative of a time period of the at least one appointment, and wherein the computer program code when executed by the processor causing the apparatus to determine of the one or more coarse location estimates by:
obtaining or gathering one or more pieces of fingerprint information, wherein the obtaining or the gathering is performed and/or controlled during the time period of the at least one appointment; and
wherein the one or more coarse location estimates are determined at least partially based on the one or more pieces of fingerprint information, wherein a respective coarse location estimate of the one or more coarse location estimates corresponds to a plurality of spaces of the one or more spaces of the venue.

20. The tangible computer-readable medium according to claim 19, wherein the computer program code when executed by the processor further causing the apparatus to:
determine one or more outliers of the determined one or more reference location estimates at least partially based on a comparison of one or more pieces of fingerprint information obtained from one or more further mobile devices with the one or more pieces of fingerprint information gathered or obtained; and discard such one or more pieces of fingerprint information of the one or more pieces of fingerprint information gathered or obtained in case a mismatch of pieces of fingerprint information is determined by the comparison.

* * * * *

UNITED STATES PATENT AND TRADEMARK OFFICE
CERTIFICATE OF CORRECTION

| | | |
|---|---|---|
| PATENT NO. | : 11,592,516 B2 | Page 1 of 1 |
| APPLICATION NO. | : 16/935990 | |
| DATED | : February 28, 2023 | |
| INVENTOR(S) | : Pavel Ivanov et al. | |

It is certified that error appears in the above-identified patent and that said Letters Patent is hereby corrected as shown below:

In the Claims

In Column 33, Line 15, Claim 12, delete "appointment and" and insert -- appointment; and --, therefor.

In Column 33, Lines 51-52, Claim 15, delete "the apparatus determine of" and insert -- the apparatus to determine --, therefor.

Signed and Sealed this
Twenty-fifth Day of June, 2024

Katherine Kelly Vidal
*Director of the United States Patent and Trademark Office*